(12) United States Patent
Eisenhour

(10) Patent No.: US 9,434,235 B2
(45) Date of Patent: Sep. 6, 2016

(54) VEHICLE AIR HANDLING SYSTEM

(75) Inventor: Ronald S. Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 1087 days.

(21) Appl. No.: 13/219,770

(22) Filed: Aug. 29, 2011

(65) Prior Publication Data

US 2013/0052929 A1 Feb. 28, 2013

(51) Int. Cl.
*B60H 1/26* (2006.01)
*B60H 1/00* (2006.01)

(52) U.S. Cl.
CPC ...... *B60H 1/00742* (2013.01); *B60H 1/00785* (2013.01); *B60H 1/00849* (2013.01)

(58) Field of Classification Search
USPC .......................................................... 454/75
See application file for complete search history.

(56) References Cited

U.S. PATENT DOCUMENTS

| | | | | |
|---|---|---|---|---|
| 4,917,293 A * | 4/1990 | Fedter et al. | ................ | 236/49.3 |
| 4,932,588 A * | 6/1990 | Fedter et al. | ................ | 236/44 R |
| 5,139,458 A * | 8/1992 | Koukal et al. | ................ | 454/147 |
| 5,516,041 A * | 5/1996 | Davis et al. | ................ | 236/49.3 |
| 5,651,498 A * | 7/1997 | Meyer et al. | ................ | 236/44 C |
| 5,720,181 A * | 2/1998 | Karl et al. | ................ | 62/180 |
| 5,934,987 A * | 8/1999 | Baruschke et al. | ................ | 454/75 |
| 5,971,287 A * | 10/1999 | Kettner et al. | ................ | 236/44 A |
| 6,168,515 B1 * | 1/2001 | Daimon et al. | ................ | 454/75 |
| 6,659,858 B2 * | 12/2003 | Kemle et al. | ................ | 454/121 |
| 6,668,917 B1 * | 12/2003 | Zeng | ................ | 165/202 |
| 6,679,075 B2 * | 1/2004 | Kampf et al. | ................ | 62/176.6 |
| 7,055,336 B2 * | 6/2006 | Menager et al. | ................ | 62/176.6 |
| 7,296,621 B2 | 11/2007 | Yonekura et al. | | |
| 7,392,838 B2 * | 7/2008 | Errington et al. | ................ | 165/204 |
| 7,413,007 B2 * | 8/2008 | Yamaoka | ................ | 165/202 |
| 2002/0197949 A1 * | 12/2002 | Kampf et al. | ................ | 454/75 |
| 2006/0270333 A1 * | 11/2006 | Hirai et al. | ................ | 454/75 |
| 2007/0130972 A1 * | 6/2007 | Jang et al. | ................ | 62/186 |
| 2008/0173437 A1 | 7/2008 | Yelles | | |
| 2010/0031680 A1 * | 2/2010 | Eisenhour et al. | ................ | 62/176.1 |
| 2010/0212332 A1 * | 8/2010 | Hofhaus et al. | ................ | 62/56 |
| 2010/0330895 A1 * | 12/2010 | Suetake et al. | ................ | 454/75 |
| 2011/0016902 A1 | 1/2011 | Eisenhour | | |
| 2012/0009859 A1 * | 1/2012 | Wijaya et al. | ................ | 454/75 |
| 2012/0152515 A1 * | 6/2012 | Okabe et al. | ................ | 165/287 |
| 2012/0252339 A1 * | 10/2012 | Senthil et al. | ................ | 454/75 |
| 2012/0312520 A1 * | 12/2012 | Hoke et al. | ................ | 165/203 |
| 2014/0318159 A1 * | 10/2014 | Eisenhour | ................ | 62/89 |

* cited by examiner

*Primary Examiner* — Gregory Huson
*Assistant Examiner* — Martha Becton
(74) *Attorney, Agent, or Firm* — Global IP Counselors, LLP

(57) ABSTRACT

An air handling system includes a housing, a blower, a sensor, an air intake valve and a controller. The housing includes an outlet to a passenger compartment, a fresh air inlet providing fresh air into the housing and a recirculated air inlet that guides air flow from the passenger compartment into the housing. The blower moves air through the housing. The air intake valve moves between a closed position blocking air flow from the fresh air inlet into the housing and an open position unblocking air flow from the fresh air inlet into the housing. The controller positions the air intake valve relative to the fresh air inlet controlling the flow of fresh air into the housing and thereby maintaining moisture density of the air flow entering the passenger compartment within a prescribed range based on humidity and temperature values from the sensor.

20 Claims, 12 Drawing Sheets

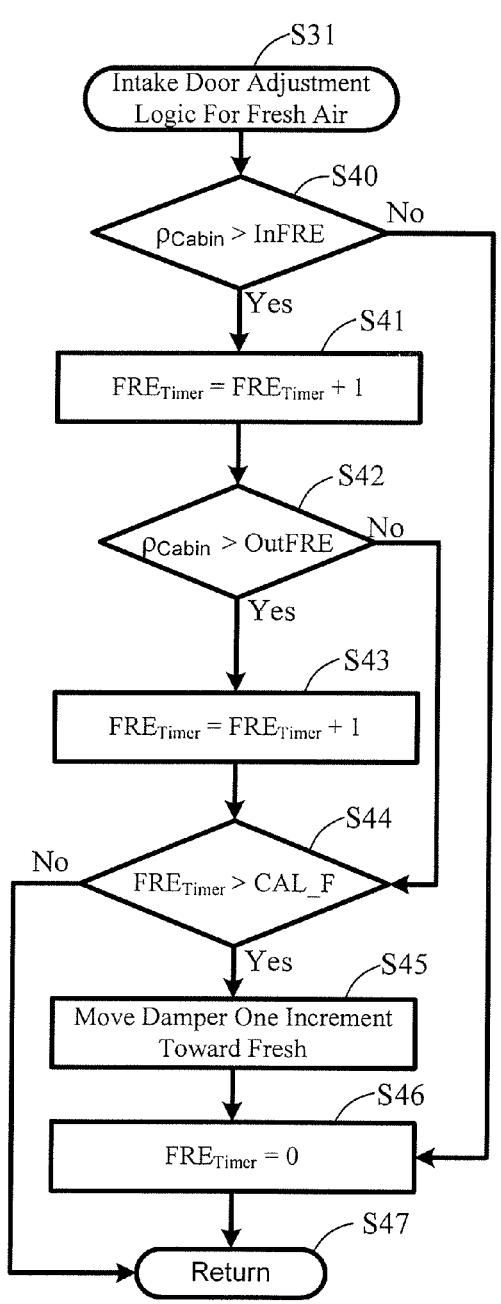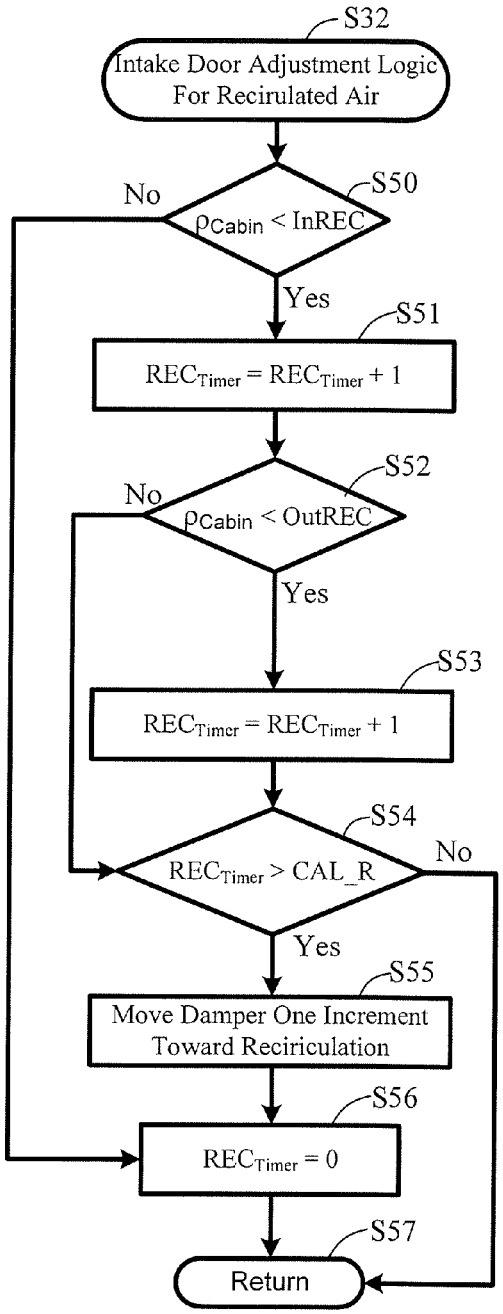
FIG. 11   FIG. 12

VEHICLE AIR HANDLING SYSTEM

BACKGROUND

1. Field of the Invention

The present invention generally relates to a vehicle air handling system. More specifically, the present invention relates to a vehicle air handling system that maintains the moisture level inside a vehicle passenger compartment within a prescribed range by controlling a mix of fresh air and recirculated air entering the passenger compartment.

2. Background Information

In many vehicles energy consumption is of great concern. For example, there is a continuing need to reduce the amount of energy used by an air conditioning system to improve the energy consumption of vehicles. In summer months, rapid cooling by air conditioning systems is often achieved by recirculating cabin air. After a short cool down period, recirculated cabin air is already cooled and the continued re-cooling of this air reduces the energy burden on the air conditioning system. By contrast, when fresh air is directed into an air conditioning system, cooled air from within the passenger compartment is exhausted from the passenger compartment so that the fresh air can enter in its place. However, cooling fresh air consumes a greater amount of energy than maintaining recirculated air in a cooled state, thus reducing the opportunity for possible power savings.

Similarly, heating fresh air in vehicles, in particular electric vehicles, where all energy is provided by a battery or batteries, reduces the opportunity for power savings that can be realized by utilizing a greater amount of recirculated air. When a fresh air source is heated, its airflow into the passenger compartment displaces previously heated air from the passenger compartment to the outside. The benefits of heating recirculated air can be significant, especially in electric vehicles or hybrid vehicles.

Unfortunately, use of recirculated air in either heating or cooling conditions allows for a build-up of passenger compartment moisture when coupled with passenger respiration/perspiration (or other moisture sources, i.e. wet floors). This is particularly problematic when the build-up of condensation causes moisture to form on interior window surfaces (fogging) or creates an unpleasant or "muggy" sense of human discomfort.

In some vehicles, a dew point temperature sensor is provided on an interior side of the windshield and serves to acquire the dew point based on a temperature and relative humidity of air flowing near the surface of the windshield. The dew point is a temperature at which water vapor contained in air will start to condense when the air is cooled. More specifically, when water vapor is cooled to the dew point temperature the water vapor becomes saturated. Relative humidity is obtained by dividing an amount of water vapor contained in ambient air at a given temperature by a saturated water vapor amount corresponding to that temperature. For example, a relative humidity of 100% reflects a condition where the ambient air is saturated with water vapor and condensation will occur. Thus, the dew point is a temperature at which the relative humidity is 100%.

Since condensation on the interior of vehicle glass can frustrate occupants and potentially impair the ability of occupants to see outside of the vehicles, it is advantageous to maintain moisture levels within a vehicle below the dew point.

SUMMARY

One object of the present invention is to control moisture density of airflow within a passenger compartment by controlling the amount of fresh air entering the passenger compartment.

In view of the state of the known technology, one aspect of the invention includes a vehicle air handling system that includes a housing, a blower, a sensor, an air intake valve mechanism and a controller. The housing includes an outlet configured to guide air flow to a passenger compartment, a fresh air inlet configured to provide air from outside the vehicle into the housing and a recirculated air inlet configured to guide air flow from the passenger compartment into the housing. The blower is arranged to move air through the housing from the fresh air inlet and the recirculated air inlet to the outlet. The sensor is positioned to obtain moisture and temperature values for the air flow through the outlet. The air intake valve mechanism is configured to move between a closed position blocking air flow from the fresh air inlet into the housing and an open position unblocking air flow from the fresh air inlet into the housing. The controller is operably coupled to the air intake valve mechanism to selectively position the air intake valve mechanism relative to the fresh air inlet to control an amount of fresh air introduced into the housing in order to maintain moisture density of the air flow entering the passenger compartment within a prescribed range based on the humidity and temperature values from the sensor.

BRIEF DESCRIPTION OF THE DRAWINGS

Referring now to the attached drawings which form a part of this original disclosure:

FIG. 11 is a third flowchart showing further operational steps conducted by the controller when operating the air handling system in the controlled blending mode in accordance with the second embodiment;

FIG. 12 is a fourth flowchart showing further operational steps conducted by the controller when operating the air handling system in the controlled blending mode in accordance with the second embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
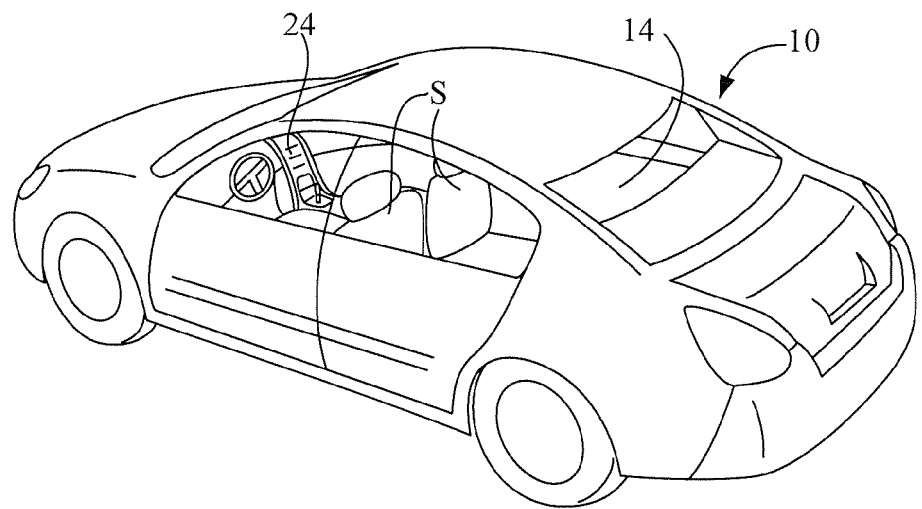
FIG. 1 is a perspective view of a vehicle having a passenger compartment and air handling system.
Figure 2:
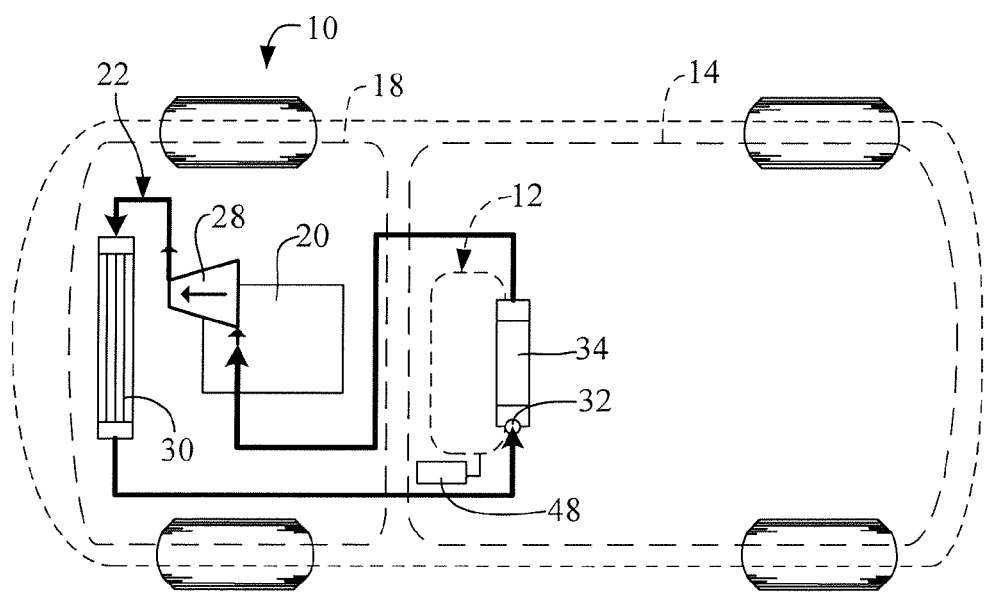
FIG. 2 is a schematic view of the vehicle showing the elements of an air conditioning system that includes the air handling system.

Referring initially to FIG. 1, a vehicle 10 is illustrated in accordance with a first embodiment. As best shown in FIG. 2, the vehicle 10 includes an air handling system 12 that provides air flow to a passenger compartment 14 of the vehicle. The air handling system 12 is configured to control the moisture level within the passenger compartment 14, as is described in greater detail below.

A brief description of the vehicle 10 is first provided with specific reference to FIGS. 1 and 2. The vehicle 10 includes, among other things, the passenger compartment 14, an engine compartment 18, a propulsion system 20, an air conditioning system 22 and the air handling system 12.

The passenger compartment 14 includes seats S, an instrument panel 24 with operator controls, and other conventional features such as a steering wheel, accelerator controls and brake controls. The operator controls of the instrument panel 24 include, for example, environmental controls (not shown) for operating heating, cooling and ventilation within the passenger compartment 14. Such operator controls are conventional features, and therefore further description is omitted for the sake of brevity. As is described further below, the environmental controls include buttons, switches and/or knobs that allow a passenger to manually select the operating state of the air handling system 12, a corresponding heating system and the air conditioning system 22. The operating state of each of these systems includes operation in a full recirculation mode, a full fresh air mode or a controlled blending mode. The full recirculation mode is a mode where all air flowing through the air handling system 12 is recirculated from the passenger compartment 14, through the air handling system 12 and back into the passenger compartment 14. The full fresh air mode is a mode where all air passing through the air handling system 12 and into the passenger compartment 14 is fresh air. The controlled blending mode is preferably an automatic mode where the air handling system 12 selectively determines an amount of fresh air that is mixed with recirculated air prior to being fed into the passenger compartment 14, as described in greater detail below.

The propulsion system 20 is located within the engine compartment 18 and can be an internal combustion engine, an electric motor or a hybrid motor system. The air conditioning system 22 is a conventional air conditioning system 22 that includes a compressor 28, a condenser 30, an expansion valve 32 and an evaporator 34. Typically, the compressor 28 and the condenser 30 are located in the engine compartment 18 and the expansion valve 32 and the evaporator 34 are located within the passenger compartment 14. However, it should be understood from the drawings and the description herein that the expansion valve 32 and the evaporator 34 can also be located within the engine compartment 18.

Similarly, the air handling system 12 is depicted as being located within the passenger compartment 14 and concealed by the instrument panel 24. However, it should be understood from the drawings and the description herein that the air handling system 12 can also be located within the engine compartment 18 with ducts directing air flow to and from the passenger compartment 14.

Figure 3:
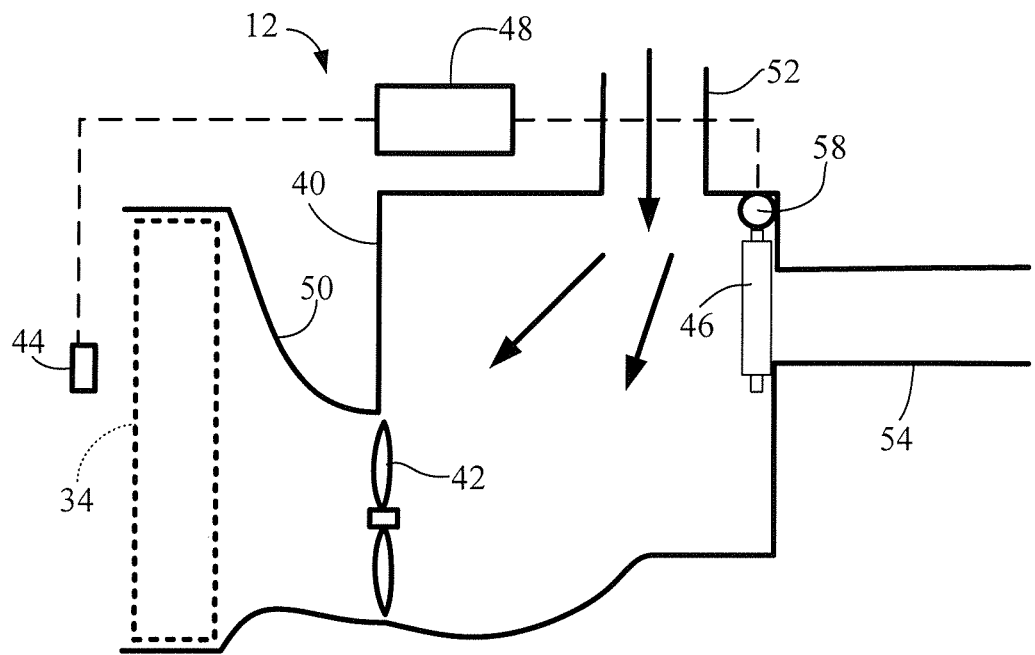
FIG. 3 is a schematic view of the air handling system showing an evaporator, a blower, a sensor, a controller and a housing that includes a fresh air inlet, a recirculation inlet, an outlet and an air intake valve mechanism, with the air intake valve mechanism positioned to allow fresh air to enter the housing.
Figure 4:
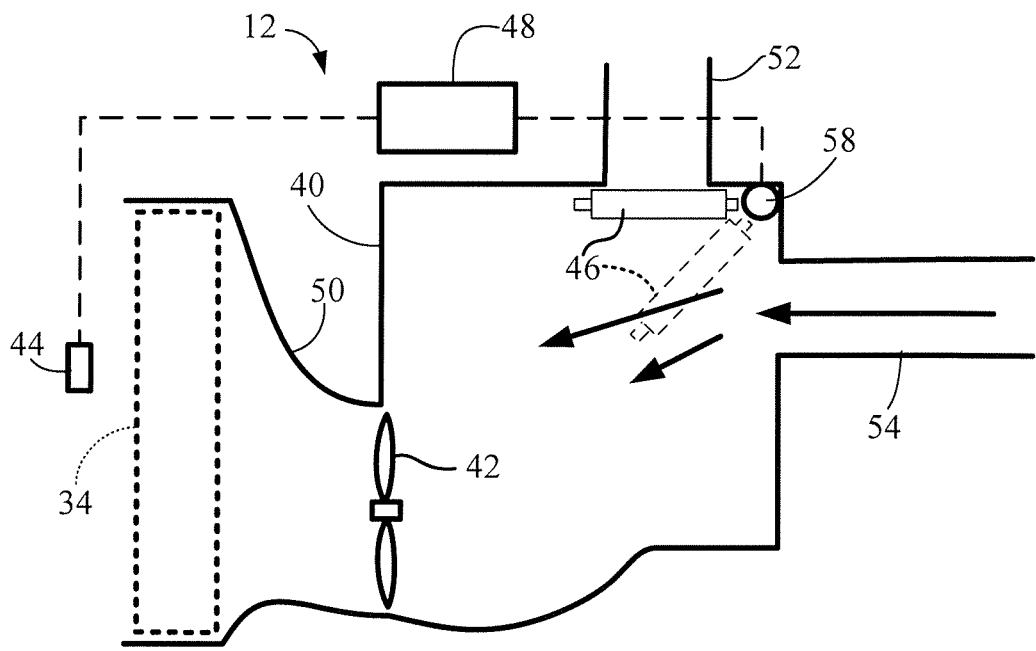
FIG. 4 is another schematic view of the air handling system similar to FIG. 3, with the air intake valve mechanism positioned to allow fresh air to enter the housing.

A description of the air handling system 12 is now provided with specific reference to FIGS. 3 and 4. More specifically, the air handling system 12 and its operation in the controlled blending mode is described below.

FIGS. 3 and 4 are schematic drawings with representations of the various features of the air handling system 12, but are not intended to convey relative dimensions or relative dimensional relationships between the elements of the system 12. Rather, FIGS. 3 and 4 show the operational relationships between the depicted elements conceptually. The various elements of the air handling system 12 can be arranged in any of a variety of ways that accomplish the task of controlling the moisture level within the passenger compartment 14. It should be understood from the drawings and the description herein that the air handling system 12 is associated with the air conditioning system 22 and operates in tandem with the air conditioning system 22. However, operation and function of the air handling system 12 can also be conducted without the air conditioning system 22. In other words, the air conditioning system 22 is not required for operation of the air handling system 12 and is not required for practice of the present invention.

As shown in FIGS. 3 and 4, the air handling system 12 basically includes a housing 40, a blower 42, a sensor 44, an air intake valve mechanism 46 and a controller 48. The housing 40 includes at least one outlet 50, a fresh air inlet 52 and a recirculated air inlet 54. The outlet 50 is configured to guide air flow to the passenger compartment 14 via ducts, such as a duct 56 shown in FIG. 6, that connect the outlet 50 to vents under and/or on the instrument panel 24. The passenger compartment 14 can also be provided with air vents in any of a variety of locations that are provided via ducts or air tubes with air from the outlet 50 in a conventional manner. The fresh air inlet 52 is configured to deliver air from outside the vehicle 10 into the housing 40. Specifically, vents, a cowl structure or other conventional air inlet systems can be utilized to supply the fresh air inlet 52 with fresh air from outside the vehicle 10. The recirculated air inlet 54 is configured to guide air flow from the passenger compartment 14 into the housing 40. For example, duct work or tubes (not shown) extending between the passenger compartment 14 and the recirculated air inlet 54 can direct air from the passenger compartment 14 to the recirculated air inlet 54.

The blower 42 is arranged to move air through the housing 40 from the fresh air inlet 52 and the recirculated air inlet 54 to the outlet 50. In the depicted embodiment, the blower 42 is disposed within the housing 40 adjacent to the outlet 50. However it should be understood from the drawings and the description herein that the blower 42 can be positioned or located outside the housing 40 or at alternative locations within the housing 40 as long as the blower 42 can selectively provide air flow through the housing 40. For example, the blower 42 can comprise a plurality of blowers, with one blower being provided at each of the fresh air inlet 52 and the recirculated air inlet 54.

As shown in FIGS. 3 and 4, the evaporator 34 is disposed at the outlet 50 such that the blower 42 can direct air flow into contact with the evaporator 34. However, as mentioned above, the air handling system 12 can operate in the absence of the air conditioning system 22 and specifically in the absence of the evaporator 34.

The housing 40 can also be provided with a heater core (not shown) that provides a heat source that heats air exiting the housing 40 and entering the passenger compartment 14. The heater core can be located downstream from the evaporator 34 or can be located adjacent to the evaporator 34 in a conventional manner.

The first embodiment demonstrates basic operation of the air handling system of the invention. The sensor or sensors can be physically located in the area of concern (i.e. the windshield and/or within the passenger compartment air mass) to obtain humidity feedback directly. Consequently, in the first embodiment, the sensor 44 can be configured to obtain only a relative humidity value. However, in the second embodiment described below, the sensor 44 preferably obtains both temperature and relative humidity values so that the actual moisture density of the air leaving the housing 40 can be more accurately established.

Figure 6:
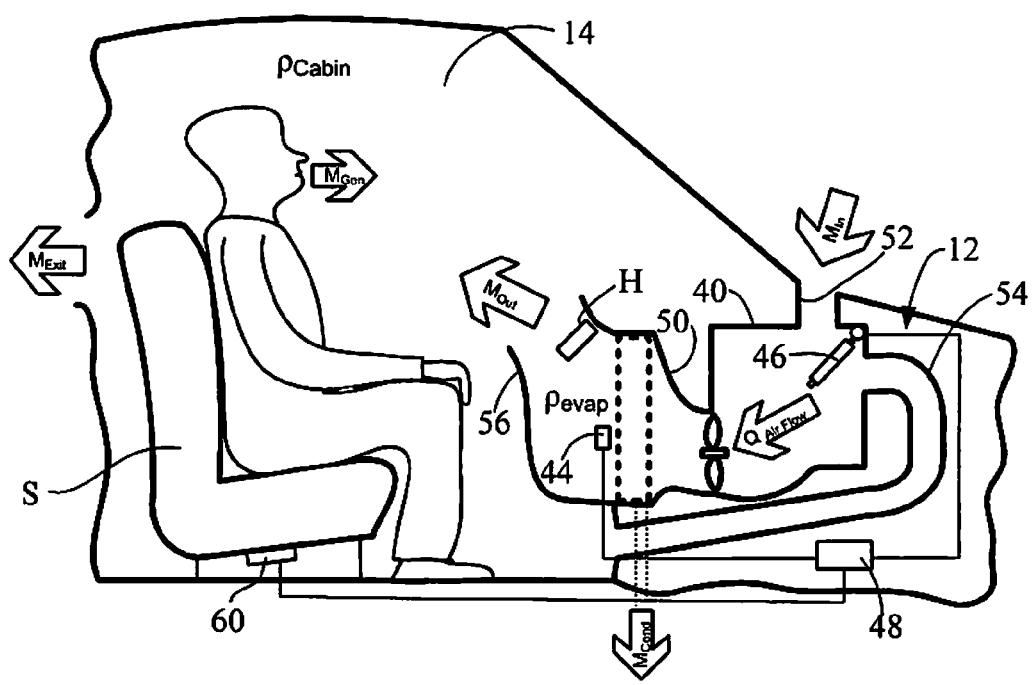
FIG. 6 is a side view of a portion of the vehicle depicted in FIG. 1, schematically showing features of the air handling system along with indications of air flow and moisture flow through the air handling system and the passenger compartment.

In the depicted embodiment, the sensor 44 is positioned to detect the humidity and optionally temperature of the air flow as it passes through from the outlet 50. However, the sensor 44 can be positioned at any of a variety of locations. For example, the sensor 44 can be positioned within the duct 56 as shown in FIG. 6, connected to the outlet 50, or be located within the outlet 50 itself or adjacent to or in contact with the evaporator 34. The sensor 44 can alternatively be located within the passenger compartment 14, but is preferably located within the structure of the outlet 50 and/or proximate a downstream side of the evaporator 34.

As mentioned above, the sensor 44 is preferably capable of detecting both the humidity and temperature of airflow. As is described in greater detail below with respect to the second embodiment, in order to determine a moisture density of a volume of air, both the relative humidity and temperature of the airflow are required. As is well known in the art, a determination of humidity or relative humidity by itself does not provide a conclusive indication of the moisture density of the measured air. In order to determine moisture density, the temperature of the air must also be measured.

As shown in FIGS. 3 and 4, the air intake valve mechanism 46 is basically a door or damper that is configured to move between a closed position (FIG. 4) blocking air flow from the fresh air inlet 52 into the housing 40 and an open position (FIG. 3) where the door does not block air flow from the fresh air inlet 52 into the housing 40. The air intake valve mechanism 46 preferably includes a stepper motor 58 connected to the controller 48. As is shown in phantom lines in FIG. 4, the air intake valve mechanism 46 can move to a plurality of intermediate positions in response to controlled movements by the stepper motor 58. The air intake valve mechanism 46 is further arranged such that in the open position (FIG. 3) the recirculated air inlet 54 is completely closed. Similarly, in the closed position (FIG. 4) the recirculated air inlet 54 is completely open. Thus, in the various intermediate positions, the air flow from the recirculated air inlet 54 and the fresh air inlet 52 into the housing 40 can be selectively controlled to provide a specific mixture of fresh air and recirculated air into the housing 40.

The controller 48 is electronically connected to both the sensor 44 and the stepper motor 58 of the air intake valve mechanism 46. More specifically, the controller 48 is operably coupled to the air intake valve mechanism 46 to selectively position the air intake valve mechanism 46 relative to the fresh air inlet 52 in order to control an amount of fresh air introduced to the housing 40. This allows the controller 48 to maintain the humidity (first embodiment) and/or moisture density (second embodiment) of the air flow entering the passenger compartment 14 within a prescribed range based on the humidity and temperature values from the sensor 44.

The prescribed range can be defined in any of a variety of ways. For example, in a first embodiment, the prescribed range is defined in terms of relative humidity levels. In the second embodiment, the prescribed range is defined in terms of moisture density. Consequently, in the first embodiment, if the controller 48 adjusts the humidity within the passenger compartment 14 by maintaining the humidity level of the air flow through the outlet 40 within fixed parameters. In other embodiments (for example, the second embodiment described below) the prescribed range can continuously change depending upon a variety of factors that are described below in the second embodiment.

Figure 5:
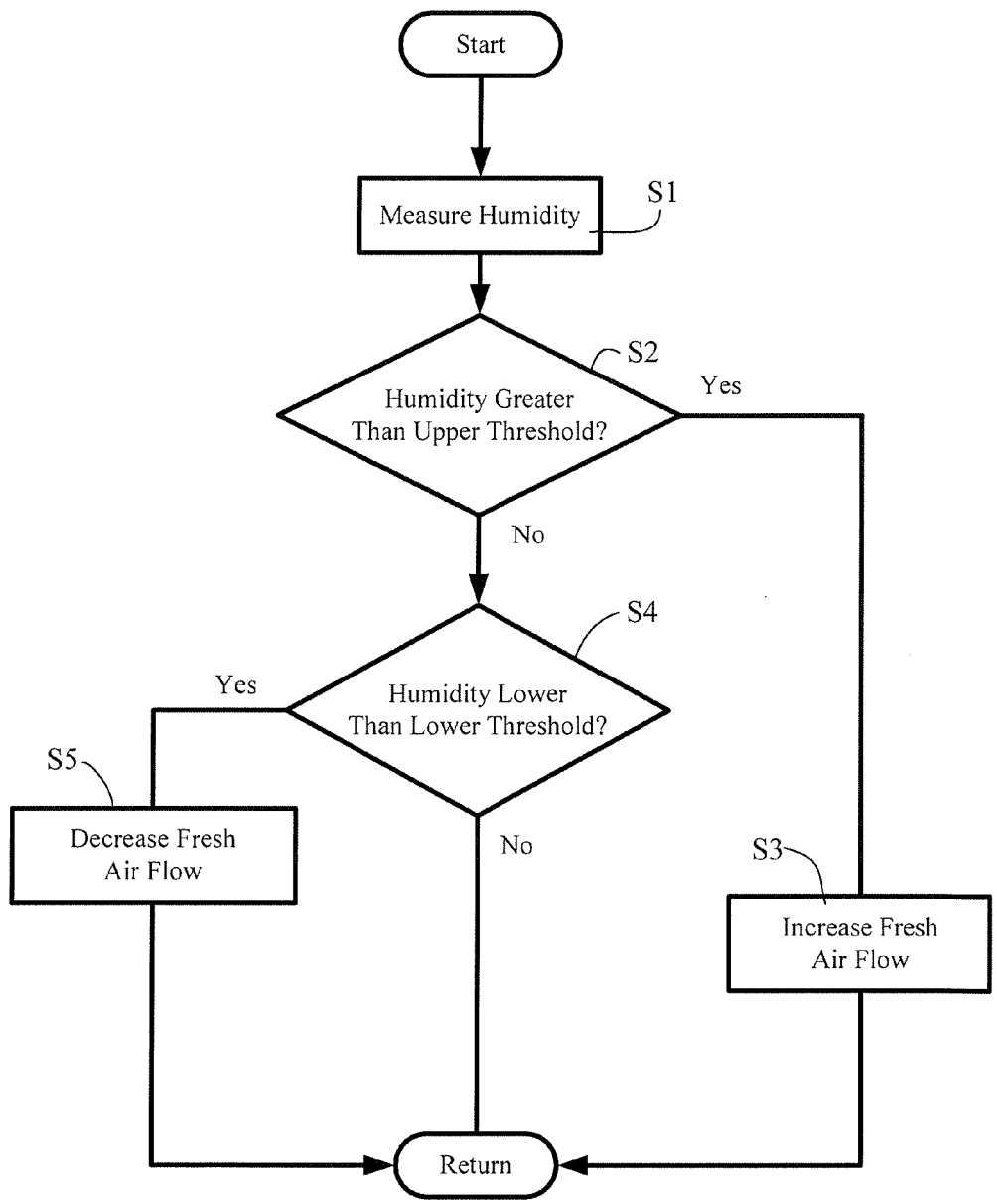
FIG. 5 is a flowchart showing basic automatic operation of the air intake valve mechanism by the controller, in accordance with a first embodiment.

FIG. 5 depicts a flowchart that shows basic operation of the air handling system 12 in accordance with the first embodiment. In the first embodiment, the prescribed range is defined between a fixed upper threshold and a fixed lower threshold. The fixed upper threshold and the fixed lower threshold define a range of humidity levels in which passengers within the passenger compartment 14 are expected to be comfortable. The fixed upper threshold and the fixed lower threshold can be predetermined based upon experimentation or upon conditions that are conventionally known to be comfortable for passengers. Hence, in the first embodiment, the fixed upper threshold and the fixed lower threshold are pre-programmed into the controller 48. Alternatively in the first embodiment, the fixed upper threshold and the fixed lower threshold can be manually set by a passenger within the passenger compartment 14 and stored in RAM memory of the controller 48.

The operations effected by the controller 48 are based upon two assumptions. The first assumption is that the moisture content of fresh air is ultimately less than the moisture content within the passenger compartment 14. The second assumption is that the passenger(s) within the passenger compartment 14 continuously release(s) moisture into the air within the passenger compartment, thus continuously increasing the humidity (or moisture density) within the passenger compartment 14. The operation of the air handling system 12 in the first embodiment controls the flow of fresh air into the housing 40 in order to maintain the humidity level within the passenger compartment 14 in line with the prescribed range.

As shown in FIG. 5, in step S1, the sensor 44 measures the humidity of the air flow passing through the outlet 50 of the housing 40. At step S2, the controller 48 compares the measured humidity level with the upper threshold. If the measured humidity is greater than the upper threshold, the controller 48 moves to step S3. At step S3, the controller 48 increases the flow of fresh air through the fresh air inlet 52 by incrementally moving the air intake valve mechanism 46 toward the open position. At step S2, if the measured humidity level is not greater than the upper threshold, the controller 48 moves to step S4.

At step S4, if the measured humidity level is lower than the lower threshold, the controller 48 moves to step S5 and decreases the flow of fresh air through the fresh air inlet 52 by incrementally moving the air intake valve mechanism 46 toward the closed position. At step S4, if the measured humidity level is not lower than the upper threshold, the controller 48 returns to step S1 where the process loops through the steps again, continuously measuring and adjusting the position of the air intake valve mechanism 46.

The above description applies equally to situations when the air conditioning system is operated and when the air conditioning system is not operating. In other words, the control of fresh air entering the housing 40 also controls the humidity level within the passenger compartment 14. Therefore, it is not necessary to use the air conditioning system 22 alone to control humidity levels. Thus, the invention provides a way to reduce energy consumption since operation of the air conditioning system 22 is not necessarily required.

The air handling system 12 and the basic steps outlined in FIG. 5 can be refined and modified in any of a variety of ways to further improve energy efficiency regardless of whether the air handling system 12 is providing cooled air flow to the passenger compartment 14 using the air conditioning system 22, providing heat to the passenger compartment 14 or simply ventilating the passenger compartment 14. The second embodiment, described below, takes many factors into consideration to further improve the energy savings capabilities of the air handling system 12.

Second Embodiment

Referring now to FIGS. 3, 4 and 6-12, operation of the air handling system 12 in accordance with a second embodiment will now be explained. In the second embodiment, the structural aspects of the air handling system 12 remain basically unchanged compared to the first embodiment. However, in the second embodiment the controller 48 is programmed differently such that the operational steps are more robust and more sophisticated than in the first embodiment, as described in greater detail below.

In the second embodiment, operations performed by the controller 48 are based upon a number of considerations and parameters. First, in the second embodiment, the controller 48 depends on the sensor 44 providing both humidity values and temperature values, preferably downstream from the evaporator 34, as shown in FIGS. 3 and 4. For instance, under certain conditions, inner surfaces the vehicle windows can form condensation (or fog-up). Such condensation is typically undesirable and can potentially impair the ability of occupants to see outside of the vehicle 10.

One solution to the condensation potential is to position the sensor 44 or a second sensor (not shown) adjacent to the windshield of the vehicle 10. Alternatively, the controller 48 can be programmed to receive the temperature and the humidity values from the sensor 44 and determine the moisture density of the air flow through the housing 40.

More specifically, the teachings of the present invention demonstrate how operations effected by the controller 48 are improved when moisture density is determined and used in the control of the air handling system 12. Operation of the controller 48 based solely on humidity values (as in the first embodiment) provides a potential for energy savings, but one disadvantage of such an operation is that relative humidity (% RH) may not be a reliable control parameter in all conditions.

For example, in prior art systems, when a defrost feature of an air handling system is used, a windshield humidity sensor, may become warm, thus causing the detected relative humidity to drop as the glass is defrosted. In such a scenario, when the defrost cycle ends or is reduced, the local temperature at the windshield sensor decreases, the relative humidity increases and the windshield can simply fog again right away (i.e., condensation can form again). A similar result can occur when compressor operation of a prior art air conditioning system is no longer needed (after reducing a high humidity condition). Once the evaporator stops cooling, moisture condensed on the evaporator releases back into the passenger compartment as it is warmed and evaporates.

The present invention, on the other hand, relies on determination of moisture density. Moisture density is determined by the controller 48 based upon measurement of relative humidity and measurement of temperature of the air flow through the housing 40. The moisture density (water mass content per unit volume, e.g., grams per cubic meter—$g/m^3$) is reasonably constant as air flow is heated or cooled in typical vehicle operating conditions. In other words, as a volume of air is heated or cooled, the moisture density of ambient air remains generally constant. However, measurement of the relative humidity (which is an indication of a person's sensitivity to the presence of moisture in the air) changes with changes in temperature. Thus, this air property (moisture density) enables a more reliable determination of the moisture condition in different areas of a vehicle, such as at the evaporator 34, at a location downstream from the heater core H (FIG. 6) and near window glass where condensation can occur.

Thus, in the second embodiment, the sensor 44 obtains temperature values and humidity values. The controller 48 receives these temperature values and humidity values and compares them to, for example, the data tabulated in Table 1, below. Table 1 includes data compiled by the inventor. This data includes correlations between measured relative humidity (% RH), measured temperature (Meas. Temp. in ° C.) and moisture density in grams per cubic meter ($g/m^3$).

TABLE 1

Measured Relative Humidity (RH)

| Meas. Temp. | 0% RH | 10 | 20 | 30 | 40 | 50 | 60 | 70 | 80 | 90 | 100% RH |
|---|---|---|---|---|---|---|---|---|---|---|---|
| −10° C. | 0.0 | 0.2 | 0.4 | 0.6 | 0.9 | 1.1 | 1.3 | 1.5 | 1.7 | 1.9 | 2.1 |
| −5 | 0.0 | 0.3 | 0.7 | 1.0 | 1.3 | 1.6 | 2.0 | 2.3 | 2.6 | 3.0 | 3.3 |
| 0 | 0.0 | 0.5 | 1.0 | 1.4 | 1.9 | 2.4 | 2.9 | 3.3 | 3.8 | 4.3 | 4.8 |
| 5 | 0.0 | 0.7 | 1.4 | 2.1 | 2.7 | 3.4 | 4.1 | 4.8 | 5.4 | 6.1 | 6.8 |
| 10 | 0.0 | 1.0 | 1.9 | 2.9 | 3.8 | 4.8 | 5.7 | 6.7 | 7.6 | 8.5 | 9.5 |
| 15 | 0.0 | 1.3 | 2.6 | 3.9 | 5.2 | 6.5 | 7.7 | 9.0 | 10.3 | 11.6 | 12.8 |
| 20 | 0.0 | 1.8 | 3.5 | 5.3 | 7.0 | 8.8 | 10.5 | 12.2 | 13.9 | 15.6 | 17.3 |
| 25 | 0.0 | 2.5 | 5.0 | 7.4 | 9.9 | 12.3 | 14.7 | 17.1 | 19.5 | 21.8 | 24.2 |
| 30 | 0.0 | 3.2 | 6.3 | 9.0 | 12.2 | 15.0 | 18.2 | 21.1 | 24.2 | 27.4 | 30.5 |
| 35° C. | 0.0 | 4.0 | 7.9 | 11.8 | 15.7 | 19.7 | 23.7 | 27.5 | 31.8 | 36.0 | 39.0 |

The operations performed by the controller 48 also include unique control logic to position the air intake valve mechanism 46 in order to manage the moisture content within the passenger compartment 14. A plurality of intermediate positions of the air intake valve mechanism 46, such as the one shown in phantom in FIG. 4, may be required to blend fresh air with recirculated air.

As shown in FIG. 6, the moisture flow in and out of the passenger compartment 14 depends on the following conditions:

"$M_{Gen}$" represents the flow rate of moisture in the air added by passenger(s) within the passenger compartment 14, estimated to be about 1.7 grams per minute per passenger.

"$M_{Out}$" represents the flow rate of moisture in the air exiting the air handling system 12 and the evaporator 34.

"$M_{Exit}$" represents the flow rate of moisture in the air leaving the passenger compartment 14 and exiting the vehicle 10.

"$M_{in}$" represents the flow rate of moisture in the air (fresh air) entering the housing 40 and hence entering the passenger compartment 14.

"$M_{Cond}$" represents the flow rate of moisture leaving the passenger compartment 14 and exiting the vehicle 10 by condensing on the evaporator 34.

"$Q_{Air\ Flow}$" represents pressurized airflow from the housing 40 and can be based upon knowledge of blower speed and flow restrictions of the housing 40 and corresponding ducts.

"$\rho_{Evap}$" represents the moisture density (g/m³) of air downstream of the evaporator 34 and is determined based on the temperature and humidity values by the sensor 44 and the data in Table 1.

"$\rho_{cabin}$" represents the overall moisture density (g/m³) of the air in the passenger compartment 14.

When the air intake valve mechanism 46 is in the closed position (FIG. 4) with no fresh air entering the housing 40, the air is fully recirculated. At this time, "$M_{in}$" and "$M_{exit}$" are theoretically both equal to zero. However, in effect, "$M_{exit}$" replaces "$M_{in}$", since the air that exits the passenger compartment becomes the source for the air conditioning system 22. When the air intake valve mechanism 46 is in the open position (FIG. 3) or in an intermediate position (in phantom in FIG. 4), "$M_{in}$" is dependent upon atmospheric conditions and therefore varies in accordance with those atmospheric conditions.

Figure 7:
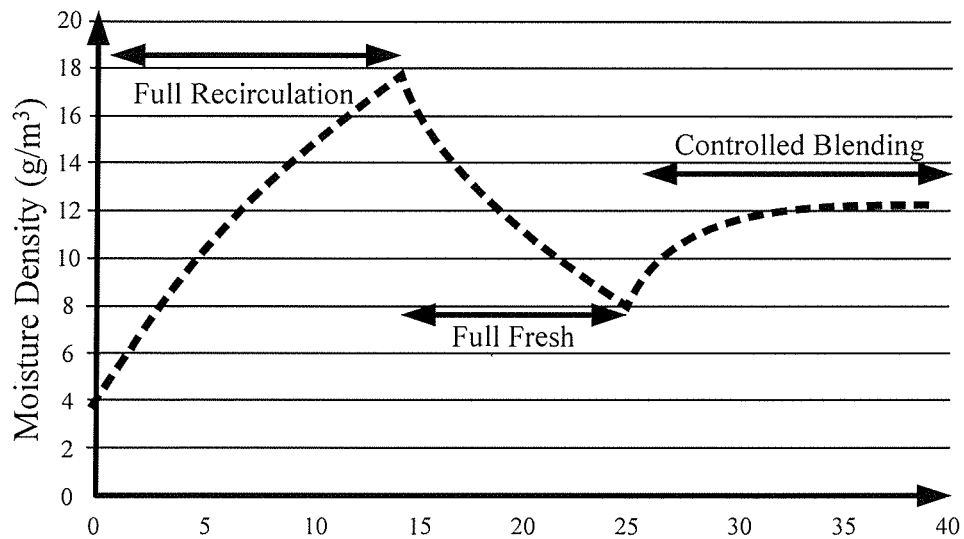
FIG. 7 is a chart indicating changes in moisture density of air within the passenger compartment with the air handling system in various modes, such as a full recirculation mode, a full fresh air mode and controlled blending mode in which fresh air is blended with recirculated air to control the moisture density in the passenger compartment, in accordance with a second embodiment.

The chart in FIG. 7 illustrates how the position of the air intake valve mechanism 46 can influence the moisture density with the air conditioning system 22 completely off (no compressor activity and little or no condensation on the evaporator 34). Specifically, in the first portion of the chart in FIG. 7, labeled Full Recirculation, the moisture density "$\rho_{cabin}$" continuously increases due to the moisture expelled by the passenger(s) "$M_{Gen}$" within the passenger compartment 14. The Full Recirculation setting corresponds to the air intake valve mechanism 46 being in the closed position, as shown in solid lines in FIG. 4.

The number of passengers in the passenger compartment 14 can be determined in any of a variety of ways. For example, seat sensors 60 (FIG. 6) can be disposed under the seats S or sensors (not shown) associated with the vehicle suspension system can estimate the number of passengers by calculating changes in the weight of the vehicle. Other proximity sensing technologies such as ultrasonic sensors, infrared sensors, and/or laser sensors can also be used. The seat sensors 60 are connected to the controller 48.

As shown in the second portion of the chart in FIG. 7, labeled Full Fresh, the moisture density "$\rho_{cabin}$" continuously decreases due to the reduced moisture density "$M_{In}$" of the fresh air entering the housing 40 and the passenger compartment 14. The Full Fresh setting corresponds to the air intake valve mechanism 46 being in the open position, as shown in FIG. 3.

However, once the logic programmed into the controller 48 is utilized, as in the third portion of the chart in FIG. 7, labeled Controlled Blending, the moisture density "$\rho_{cabin}$" within the passenger compartment 14 stabilizes. While the Controlled Blending setting is selected the position of the air intake valve mechanism 46 is continuously adjusted by the controller 48 to any of a plurality of intermediate positions, such as the intermediate position shown in phantom lines in FIG. 4.

Another important function performed by the controller 48 is the use of logic to determine the prescribed range of the passenger compartment 14. Specifically, human comfort depends not only on the temperature of the surrounding air, but also the relative humidity of the surrounding air. In order to provide a comfortable environment, the controller 48 is programmed to maintain the moisture density "$\rho_{cabin}$" of the passenger compartment at or below a density level that corresponds to 50% relative humidity (% RH).

As mentioned above, under certain conditions, moisture can condense onto interior surfaces of the vehicle 10. Typically, condensation will occur at a given temperature when the relative humidity reaches 100%. The logic programmed into the controller 48 also takes this into consideration by making adjustments to maintain the moisture density within a prescribed range. Specifically, the controller 48 makes adjustments intended to avoid moisture density values that correspond to the temperature and relative humidity numbers in the cells of look-up Table 1 that are highlighted with thick black lines. For example, the cells at the right hand side of Table 1 that are highlighted with thick black lines are a second sub-set of data corresponding to levels of moisture density at which condensation can form on passenger compartment surfaces such as the windows of the vehicle 10.

However, sub-set of moisture density data highlighted with thick black lines at the center of look-up Table 1 defines a prescribed range for passenger comfort within the passenger compartment 14.

With reference to FIG. 6, the calculation of the steady state moisture density "$\rho_{cabin}$" within the passenger compartment 14 takes the following equations into consideration:

$$M_{Exit} = M_{out} + (M_{Gen} \times (\#persons))$$

$$\rho_{cabin} \times Q_{Air\ Flow} = (\rho_{Evap} \times Q_{Air\ Flow}) + (M_{Gen} \times (\#persons))$$

$$\rho_{cabin} = \rho_{Evap} + (M_{Gen} \times (\#persons))/Q_{Air\ Flow} \qquad \text{Equation 1}$$

Some further considerations include the fact that at higher airflow rates ($Q_{Air\ Flow}$), the cabin moisture density $\rho_{cabin}$ is reduced. In addition, unusually elevated moisture levels in the cabin (e.g., due to snow or wet clothing, etc.) can be compensated for by over-estimating of the number of passengers (# persons) in the vehicle to provide robustness against window fogging (i.e., add one or two passengers to the actual number of persons in the vehicle).

The controller 48 uses Table 1 to determine the moisture density $\rho_{Evap}$ of air at various relative humidity values. In most cases, the evaporator airflow $Q_{Air\ Flow}$ provides the principal mechanism of moisture transport into the passenger compartment 14. Thus, the sensor 44 placed at the downstream side of the evaporator 34 (according to Equation 1) obtains a reading that is indicative of the moisture density $\rho_{cabin}$ less the moisture added by passenger(s). For example, if the sensor 44 obtains a temperature value of 10° C. and a humidity value of 80% RH, the moisture density is 7.6 g/m³. By comparison, if one were interested in the moisture density required to condense water (100% RH) on the windows of the vehicle at 15° C., the moisture density is 12.8 g/m³.

Consequently, the readings from the sensor 44 provide a reliable way for the controller 48 to determine the moisture density $\rho_{Evap}$ and consequently $\rho_{cabin}$ within the passenger compartment 14. The temperature and humidity values from the sensor 44 are used in combination with Equation 1 and the data in Table 1 to provide feedback to the controller 48. Specifically, the human comfort and window fogging constraints can be found in Table 1 and serve as a cabin moisture control limit for the controller 48.

Figure 8:
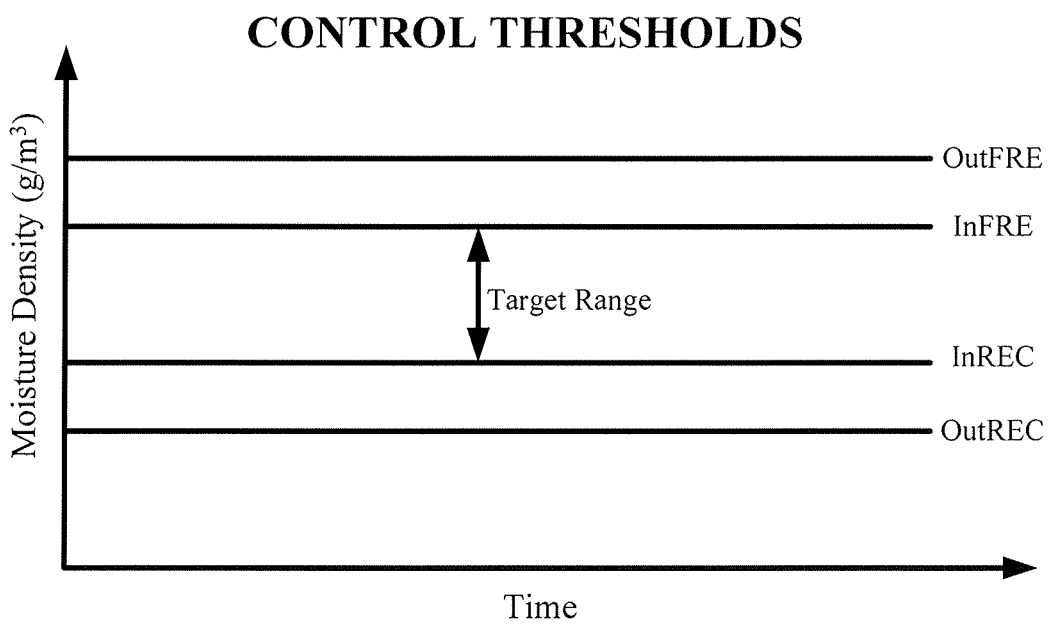
FIG. 8 is a chart showing representations of a target range of moisture density, along with moisture density level thresholds determined by a controller that operates the air handling system, the controller using the moisture density level thresholds in the controlled blending mode in which fresh air is blended with recirculated air in accordance with the second embodiment.

In the logic set forth in the flowcharts of the second embodiment, it is necessary to establish control thresholds based on the human comfort and fogging constraints. These control thresholds are depicted in the graph shown in FIG. 8. In FIG. 8, the space labeled target range represents the moisture density level or range desired for optimal comfort of the passenger(s) in the passenger compartment 14 or a limit determined by a window fogging constraint. The control thresholds are defined above and below the Target. The control thresholds are used by the controller 48 to maintain the moisture density $\rho_{cabin}$ within the prescribed range, and preferably as close to the Target as possible. The control thresholds are used in the logic set forth in the flowcharts depicted in FIGS. 9-12. The control thresholds in FIG. 8 include:

"InFRE" is an inner moisture density threshold that is compared to the determined moisture density $\rho_{Evap}$ (based upon the values by the sensor 44) by the controller 48 when controlling the amount of fresh air entering the housing 40.

"OutFRE" is an outer moisture density threshold greater than the variable "InFRE", and is compared to the determined moisture density $\rho_{Evap}$ (based upon the values detected by the sensor 44) by the controller 48 when controlling the amount of fresh air entering the housing 40.

"InREC" is an inner moisture density threshold that is compared to the determined moisture density $\rho_{Evap}$ (based upon the values detected by the sensor 44) by the controller 48 when controlling the amount of recirculated air entering the housing 40.

"OutREC" is an outer moisture density threshold defined to be less than the variable "InREC", and is compared to the determined moisture density $\rho_{Evap}$ (based upon the values detected by the sensor 44) by the controller 48 when controlling the amount of recirculated air entering the housing 40.

As shown in FIG. 8, there are two control thresholds OutFRE and InFRE above a target range and two control thresholds OutREC and InREC below the target range. These differing moisture density thresholds are provided in order to more optimally time adjustments to the positioning of the air intake valve mechanism 46 by the controller 48. Specifically, the inventor has found that without pre-programmed timing delays, the controller 48 can re-position the air intake valve mechanism 46 far too often, thereby overcompensating for variations in the determined moisture density levels. Timing variables RECTimer (recirculated air timer) and FRETimer (fresh air timer) are therefore used in the control logic executed by the controller 48, as described below in the flowcharts of FIGS. 9-12.

A description of the operational steps performed by the controller 48 is now provided with specific reference to FIGS. 9-12.

Figure 9:
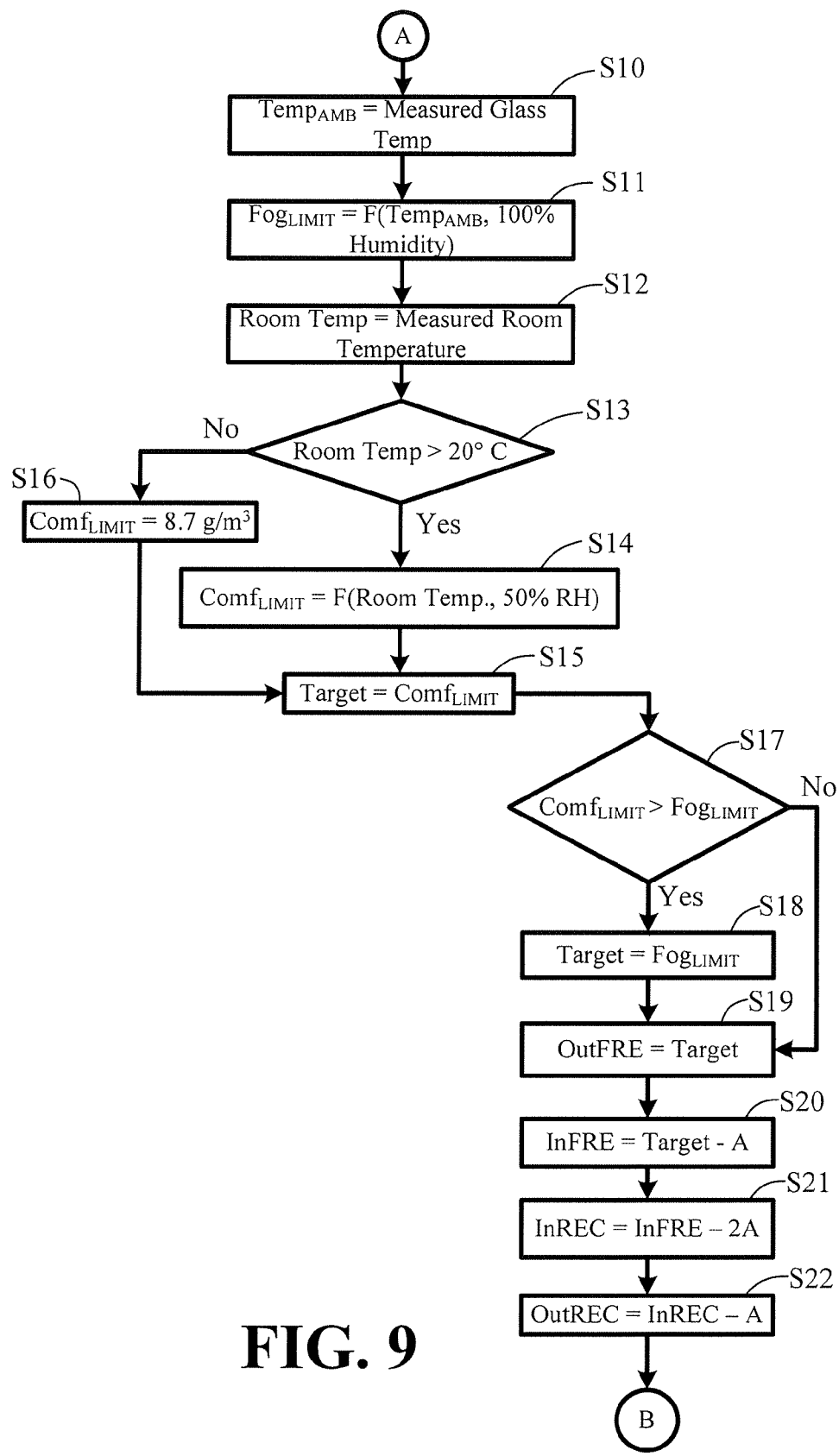
FIG. 9 is a first flowchart showing operational steps conducted by the controller when operating the air handling system in the controlled blending mode in accordance with the second embodiment.

The flowchart in FIG. 9 shows logic that defines the various moisture density control thresholds. Specifically, at step S10, the controller 48 receives the temperature values from a windshield or glass sensor (not shown) and defines the measured glass temperature as $Temp_{AMB}$. At step S11, a variable $Fog_{LIMIT}$ is defined via the data in the Table 1. Specifically, in Table 1 the value of $Temp_{AMB}$ corresponds with a moisture density that occurs at 100% RH. The moisture density at 100% relative humidity given the temperature $Temp_{AMB}$ then becomes $Fog_{LIMIT}$. The variable $Fog_{LIMIT}$ thereafter serves as a limit value to prevent condensation (a fogging effect) from forming on the windows in the passenger compartment 14.

At step S12 in FIG. 9, the controller 48 receives temperature values from the sensor 44 and defines the variable RoomTemp. At step S13, a determination is made as to whether or not RoomTemp is greater than 20° C. If RoomTemp is greater than 20° C., then operation moves to step S14. At step S14, a variable $\text{Comf}_{LIMIT}$ is defined as being equal to the moisture density in Table 1 corresponding with RoomTemp at 50% relative humidity. Operation then moves to step S15.

At step S13, if RoomTemp is not greater than 20° C., then operation moves to step S16. In step S16, the variable $\text{Comf}_{LIMIT}$ is defined as being equal 8.7 g/m³. Operation then moves to step S15.

At step S15, a variable Target is set equal to the variable $\text{Comf}_{LIMIT}$. Thereafter, operation moves to step S17. At step S17, a determination is made as to whether or not the variable $\text{Comf}_{LIMIT}$ is greater than the variable $\text{Fog}_{LIMIT}$. If $\text{Comf}_{LIMIT}$ is greater than $\text{Fog}_{LIMIT}$, then operation moves to step S18. If $\text{Comf}_{LIMIT}$ is not greater than $\text{Fog}_{LIMIT}$, then operation moves to step S19.

At step S18, the variable Target is set equal to the variable $\text{Fog}_{LIMIT}$. At step 19, the variable OutFRE is set equal to the variable Target. Operation then moves in succession to steps S20, S21 and S22. At step S20, the variable InFRE is set equal to Target minus A, where A is a calibration value (e.g., 0.25 g/m³, but can be re-defined depending upon a particular vehicle design, the size of the passenger compartment 14 and/or other design parameters). At step S21, the variable InREC is set equal to InFRE minus 2 A. At step S22, the variable OutREC is set equal to InREC minus A.

Figure 10:
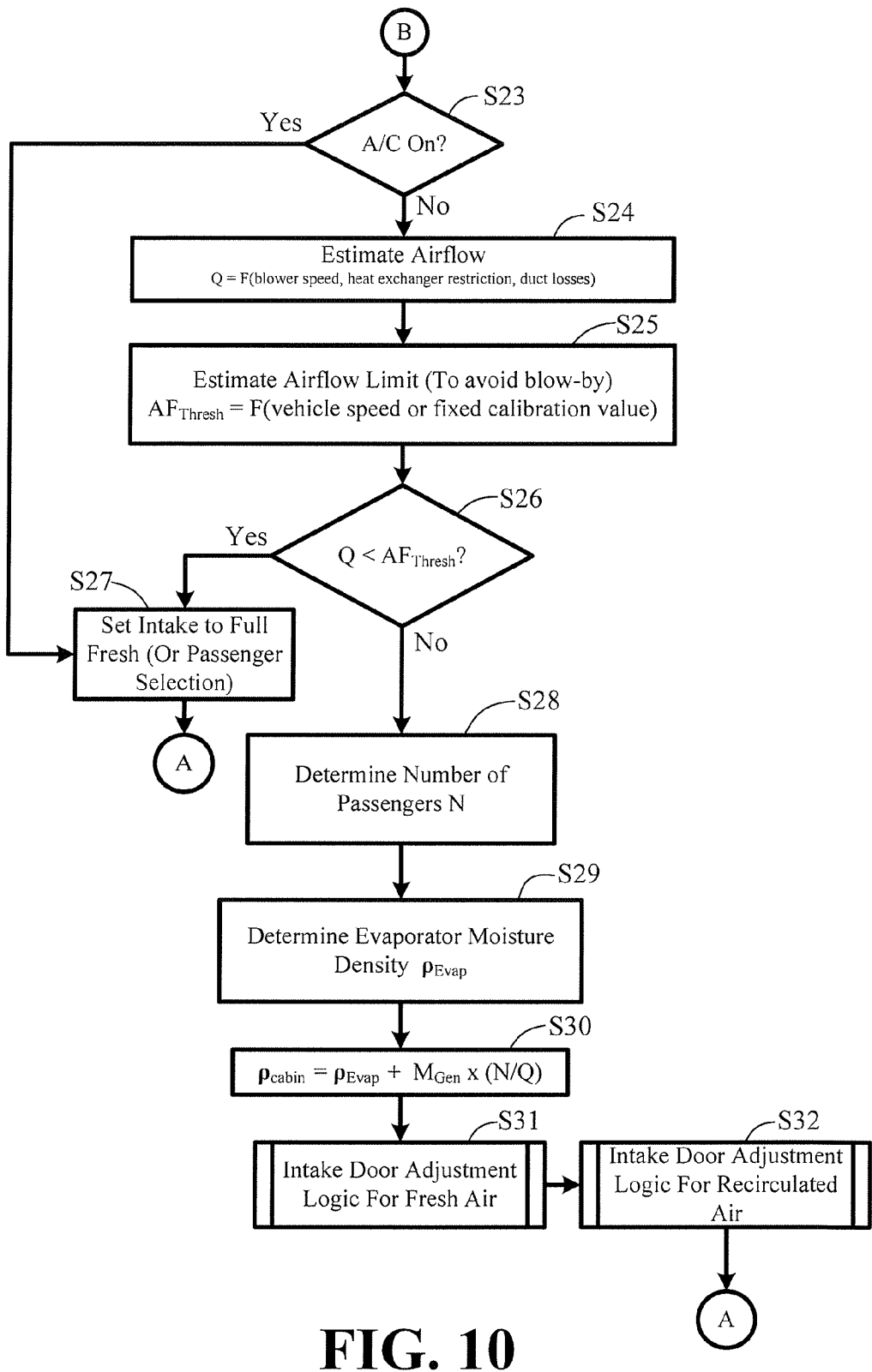
FIG. 10 is a second flowchart showing further operational steps conducted by the controller when operating the air handling system in the controlled blending mode in accordance with the second embodiment.

As description of the logic illustrated in the flowchart of FIG. 10 is now provided. FIG. 10 depicts a second flowchart that is a continuation of the flowchart in FIG. 9.

The logic presented in the operational steps depicted in FIG. 10 show how the values detected by the sensor 44 are used by the controller 48 to compute an estimated passenger compartment steady state moisture density. If the airflow through the housing 40 is low (e.g., below a predetermined calibration threshold such as a third of the maximum blower motor speed), the air intake valve mechanism 46 is set to the open position or full fresh air position (step S27). This action serves to avoid fresh-to-cabin intake plenum air blow-by that can occur through the recirculation port due to vehicle motion (i.e., where air does not get processed by the blower). In addition, when the blower speed is relatively low, passenger compartment air is typically not mixed very well (e.g., pockets of humid air may exist), thus increasing the potential for window fogging.

As shown in FIG. 10, at step S23, the controller 48 determines whether or not the air conditioning system 22 is on. If the air conditioning system 22 is off, then operation moves to step S24. If the air conditioning system 22 is on, then operation moves to step S27.

At step S24, the airflow Q exiting the outlet 50 of the housing 40 is estimated based upon at least the speed setting of the blower. For example, the blower speed can be a starting point for such an estimation. However, this value can optionally be further refined based upon a number of other considerations such as air flow restrictions associated with the evaporator 34 and/or the heater core and possible air flow losses attributable to vent or duct geometry. Of course the magnitude of such restrictions and losses will vary from vehicle to vehicle and can be determined through testing. In any case, taking into account the restrictions and losses within the air handling system 12 can provide a more reliable estimation of the flow rate of air exiting the outlet 50.

At step S25, the controller 48 determines an estimated airflow threshold $\text{AF}_{Thresh}$, which is an airflow value that is desirable to remain above in a given situation in order to avoid blow-by. The estimated airflow threshold $\text{AF}_{Thresh}$ is determined as a function of the vehicle speed or can alternatively be a fixed calibration value that is predetermined based on the particular vehicle design. The estimated airflow threshold $\text{AF}_{Thresh}$ takes into account the effects of vehicle speed on air pressure within the air handling system 12 and/or passenger compartment 14, which in turn has an effect on the air movement within the passenger compartment 14. For example, a range of threshold values can be determined by monitoring air pressure at different points within the air handling system 14 while varying vehicle speed.

At step S26, the controller 48 determines whether or not the air flow Q is less than the threshold $\text{AF}_{Thresh}$. If Q is less than $\text{AF}_{Thresh}$, then operation moves to step S27. If Q is not less than $\text{AF}_{Thresh}$, then operation moves to step S28. At step S27, the air intake valve mechanism 46 is set the open position (full fresh air position) or, if the vehicle passenger has selected an alternative setting, then the passenger's selection is implemented or maintained instead.

At step S28, the controller 48 determines the number of passengers within the passenger compartment 14. The number of passengers can be determined based upon signals from the seat sensors 60, or alternatively can be determined from suspension movement corresponding to increased loads within the vehicle, corresponding to an increase in the number of passengers in the vehicle. Suspension movement can be detected by suspension sensors (not shown).

At step S29, the controller 48 determines the evaporator moisture density $\rho_{Evap}$ based on the temperature and humidity values detected by the sensor 44, which are in turn used to look up the corresponding moisture density in Table 1. At step S30, the passenger compartment moisture density $\rho_{cabin}$ is calculated using $\rho_{Evap}$ plus the product of the variables $\text{M}_{Gen}$ and the number of passengers divided by the air flow Q. As defined above, $\text{M}_{Gen}$ represents the flow rate of moisture added by each passenger and is estimated to be about 1.7 grams per minute per passenger.

With these calculations completed, operation moves first to step S31 and then to step S32. Step S31 is a subroutine for controlling the position of the air intake valve mechanism 46 (or Intake Door). The subroutine S31 is labeled Intake Door Adjustment Logic for Fresh Air, and is shown in FIG. 11. The subroutine S32 is labeled Intake Door Adjustment Logic for Recirculated Air, and is shown in FIG. 12.

The subroutine S31 (FIG. 11) and the subroutine S32 (FIG. 12) both include logic for timing loops that enable the controller 48 to periodically adjust the position of the air intake valve mechanism 46. The timing loops are based on relationships between the estimated cabin moisture density $\rho_{cabin}$ and the thresholds defined above and described with respect to FIG. 8. Using these timing loops, the controller 48 repeatedly nudges or adjusts the position of the air intake valve mechanism 46 as needed.

The subroutine S31 is labeled Intake Door Adjustment Logic for Fresh Air, and is shown in FIG. 11. As shown in FIG. 11, at step S40, the controller 48 determines whether or not the estimated cabin moisture density $\rho_{cabin}$ is greater than the variable InFRE. If the estimated cabin moisture density $\rho_{cabin}$ is greater than InFRE, then operation moves to step S41. If the estimated cabin moisture density $\rho_{cabin}$ is not greater than InFRE, then operation moves to step S46 (described below). At step S41, a fresh air timing variable $\text{FRE}_{Timer}$ is incremented.

At step S42, the controller 48 determines whether or not the estimated cabin moisture density $\rho_{cabin}$ is greater than the variable OutFRE. If the estimated cabin moisture density $\rho_{cabin}$ is greater than the variable OutFRE, then operation moves to step S43. If the estimated cabin moisture density $\rho_{cabin}$ is not greater than OutFRE, then operation moves to step S44. At step S43, the fresh air timing variable $FRE_{Timer}$ is incremented.

At step S44, the controller 48 determines whether or not the fresh air timing variable $FRE_{Timer}$ is greater than a pre-defined calibration value CAL_F. The calibration value CAL_F represents a threshold the fresh air timing variable $FRE_{Timer}$ must exceed before the controller 48 will take action to adjust the position of the air intake valve mechanism 46. An appropriate threshold can depend on the design of the vehicle and the air handling system 12 and in particular the characteristics of air flow therethrough. More specifically, the calibration value CAL_F is provided to optionally limit the frequency at which the controller adjusts the position of the air intake valve mechanism 46. For example, a higher threshold such as two can be used to increase the amount of time between adjustments. Conversely, a lower threshold such as one can be used to decrease the amount of time between adjustments.

If the variable $FRE_{Timer}$ is greater than the calibration value CAL_F, then operation moves to step S45. If $FRE_{Timer}$ is not greater than CAL_F, then operation moves to step S47. At step S45, the controller 48 incrementally moves the air intake valve mechanism 46 (the damper) toward the open position, thus increasing the amount of fresh air (i.e., moving the air intake valve mechanism 46 toward a fresh air mode). Next operation move to step S46 where the variable $FRE_{Timer}$ is made equal to zero. Next, at step S47, the subroutine S31 in FIG. 10 is completed and control returns to the logic depicted in FIG. 10 and to the subroutine S32.

The subroutine S32 is labeled Intake Door Adjustment Logic for Recirculated Air, and is shown in FIG. 12. At step S50, the controller 48 determines whether or not the estimated cabin moisture density $\rho_{cabin}$ is less than InREC. If the estimated cabin moisture density $\rho_{cabin}$ is less than InREC, then operation moves to step S51. If the estimated cabin moisture density $\rho_{cabin}$ is not less than InREC, then operation moves to step S56 (described below). At step S51, a recirculation timing variable $REC_{Timer}$ is incremented.

At step S52, the controller 48 determines whether or not the estimated cabin moisture density $\rho_{cabin}$ is less than OutREC. If the estimated cabin moisture density $\rho_{cabin}$ is less than OutREC, then operation moves to step S53. If the estimated cabin moisture density $\rho_{cabin}$ is not less than OutREC, then operation moves to step S54. At step S53, the recirculation timing variable $REC_{Timer}$ is incremented.

At step S54, the controller 48 determines whether or not the recirculation timing variable $REC_{Timer}$ is greater than a pre-defined calibration value CAL_R. Similar to the calibration value CAL_F discussed above, the calibration value CAL_R represents a threshold the recirculation timing variable $REC_{Timer}$ must exceed before the controller 48 will take action to adjust the position of the air intake valve mechanism 46. More specifically, the calibration value CAL_R limits the frequency at which the controller adjusts the position of the air intake valve mechanism 46 and can depend on the particular design of the vehicle and the air handling system 12.

If variable $REC_{Timer}$ is greater than calibration value CAL_R, then operation moves to step S55. If $REC_{Timer}$ is not greater than CAL_R, then operation moves to step S57. At step S55, the controller 48 incrementally moves the air intake valve mechanism 46 (the damper) toward the closed position, thus reducing the amount of fresh air (i.e., moving the air intake valve mechanism 46 toward a recirculation mode). Next operation move to step S56 where the variable $REC_{Timer}$ is made equal to zero. Next, at step S57, the subroutine S32 is completed and control returns to the logic depicted in FIG. 10 and to the circle A. The circle A, shown at the top of FIG. 9 and bottom of FIG. 10, represents control returning to the logic at the top of FIG. 9.

Figure 13:
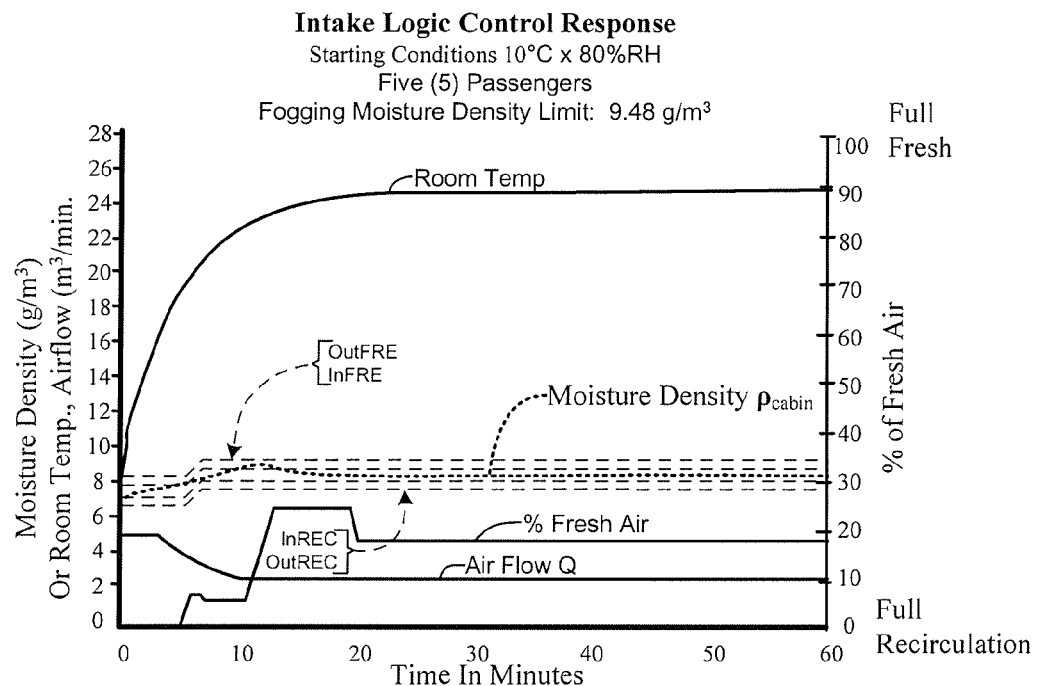
FIG. 13 is a first chart showing a first set of data collected from a test of the air handling system operated in the controlled blending mode in accordance with the second embodiment.
Figure 14:
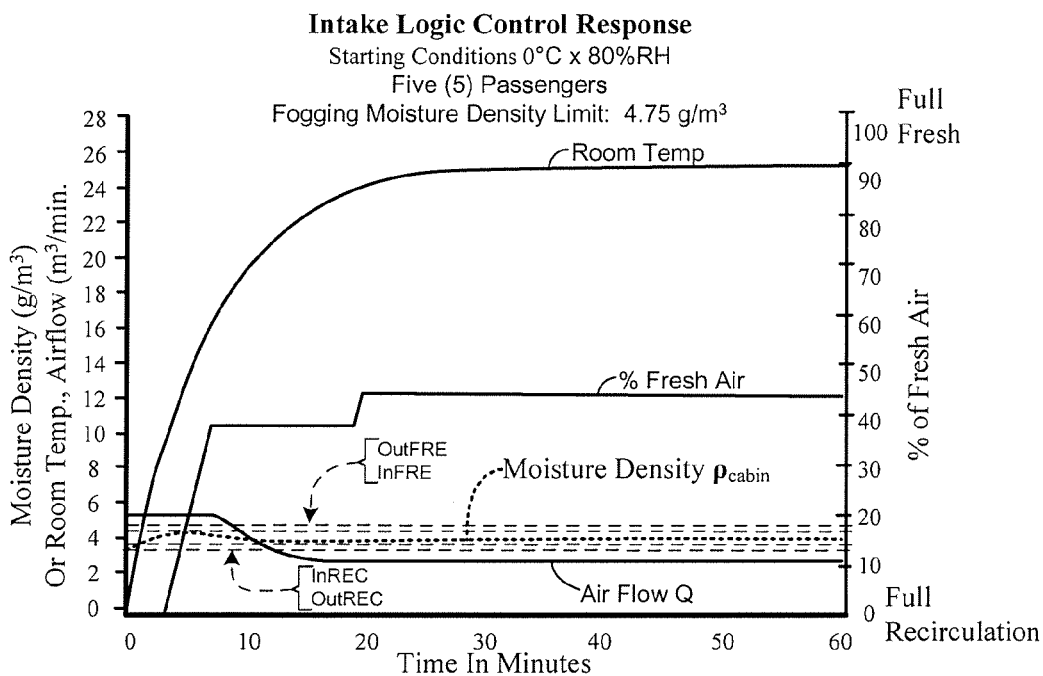
FIG. 14 is a second chart showing a second set of data collected from another test of the air handling system operated in the controlled blending mode in accordance with the second embodiment.
Figure 15:
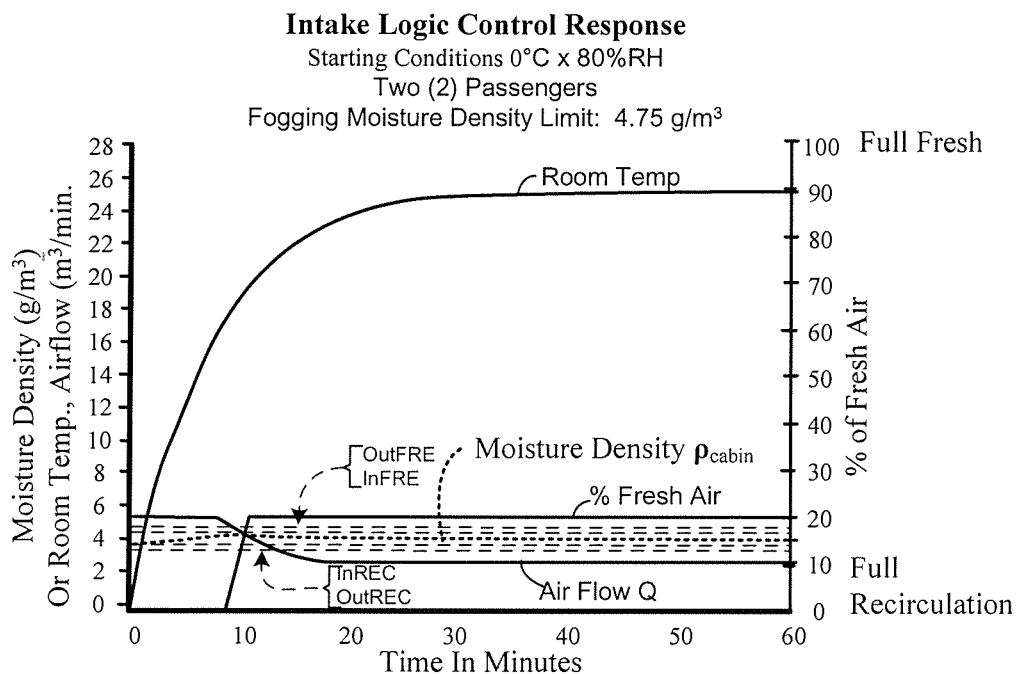
FIG. 15 is a third chart showing a third set of data collected from yet another test of the air handling system operated in the controlled blending mode in accordance with the second embodiment.

FIGS. 13, 14 and 15 are charts with plotted data from tests conducted using the logic set forth in the flowcharts of FIGS. 9-12. The air conditioning system 22 was not operated during these tests. However, the heater core H provided selective amounts of heat. Specifically, FIGS. 13-15 demonstrate the logic's functionality in a variety of operating conditions. The charts typify the tendency to begin in the recirculated air mode and determine the humidity requirements, followed by an introduction of some fresh air into the air handling system 12 to eliminate unwanted moisture.

Specifically, FIG. 13 shows data acquired during use of the operating logic in a vehicle with five (5) passengers in an operating condition of 10° C. with a relative humidity of 80% RH. The fogging moisture density limit ($Fog_{Limit}$) was determined to be 9.48 g/m³. As can be ascertained from both the room temperature value from the sensor 44 and the moisture density $\rho_{cabin}$ the system performed well, providing an appropriate moisture level for the five passengers in the passenger compartment 14 in just a few minutes with a relatively low air flow Q.

Similarly, FIG. 14 shows data acquired during use of the operating logic in a vehicle that also included five (5) passengers in an operating condition of 0° C. with a relative humidity of 80% RH. The fogging moisture density limit ($Fog_{Limit}$) was determined to be 4.75 g/m³. As can be ascertained from both the room temperature value and the moisture density $\rho_{cabin}$ the system performed well, providing an appropriate moisture level for the five passengers in the passenger compartment 14 in just a few minutes with a relatively low air flow Q. The data in FIG. 14 demonstrates how the moisture density threshold above which moisture condenses on surfaces within the passenger compartment decreases as the temperature decreases. In such cases, a higher proportion of fresh air must be introduced into air flow through the passenger compartment 14 in order to prevent fogging effects.

In FIG. 15, only two passengers were located in the passenger compartment 14. The vehicle's operating condition was 0° C. with a relative humidity of 80% RH. The fogging moisture density limit ($Fog_{Limit}$) was determined to be 4.75 g/m³. The system performed well, providing an appropriate moisture level for the two passengers in the passenger compartment 14 in just a few minutes with a relatively low air flow Q. FIG. 15 shows a greater use of recirculated air with two passengers than with five passengers. This was made possible by the fact that the rate at which moisture was introduced to the passenger compartment 14 by occupants was greatly reduced.

Figure 16:
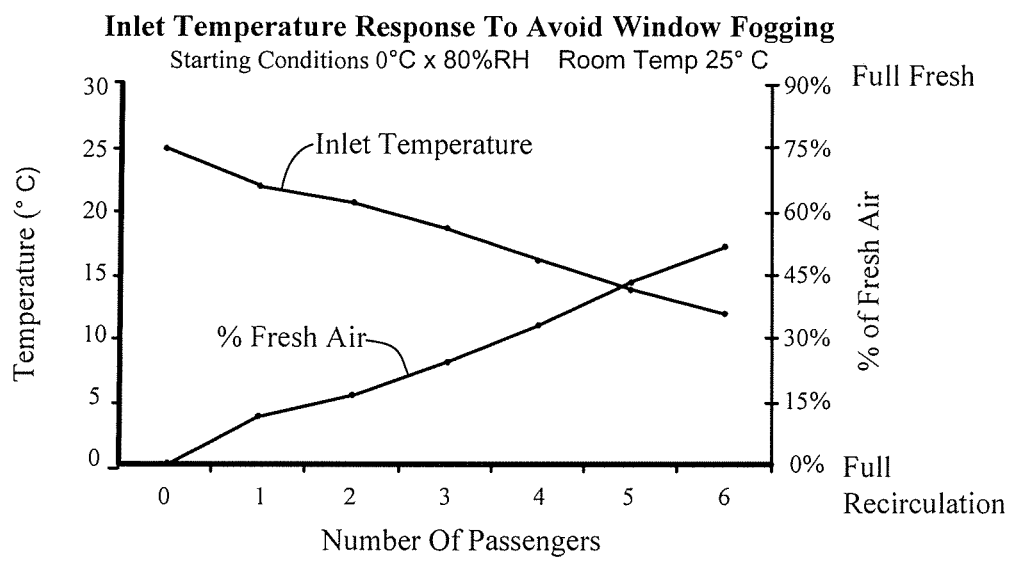
FIG. 16 is a chart showing data tabulated from a series of test conducted using the air handling system, where the number of passengers varied from test to test and where the inlet temperature (detected by the sensor of the air handling system) as well as the amount of fresh air mixed with recirculated air in the air handling system was obtained in the controlled blending mode in accordance with the second embodiment.

FIG. 16 is a chart showing data tabulated from a series of tests conducted using the air handling system 12 where the number of passengers varied from test to test. The operating condition was 0° C. with a relative humidity of 80%. The inlet temperature (measured by the sensor 44 of the air handling system 12) was obtained as well as the amount of fresh air mixed with recirculated air in the air handling system 12 required to avoid window condensation or window fogging with the controller 48 operating in the controlled blending mode. Similarly to FIG. 15, FIG. 16 illustrates the impact of occupancy on the required proportion of fresh air to avoid fogging effects.

Figure 17:
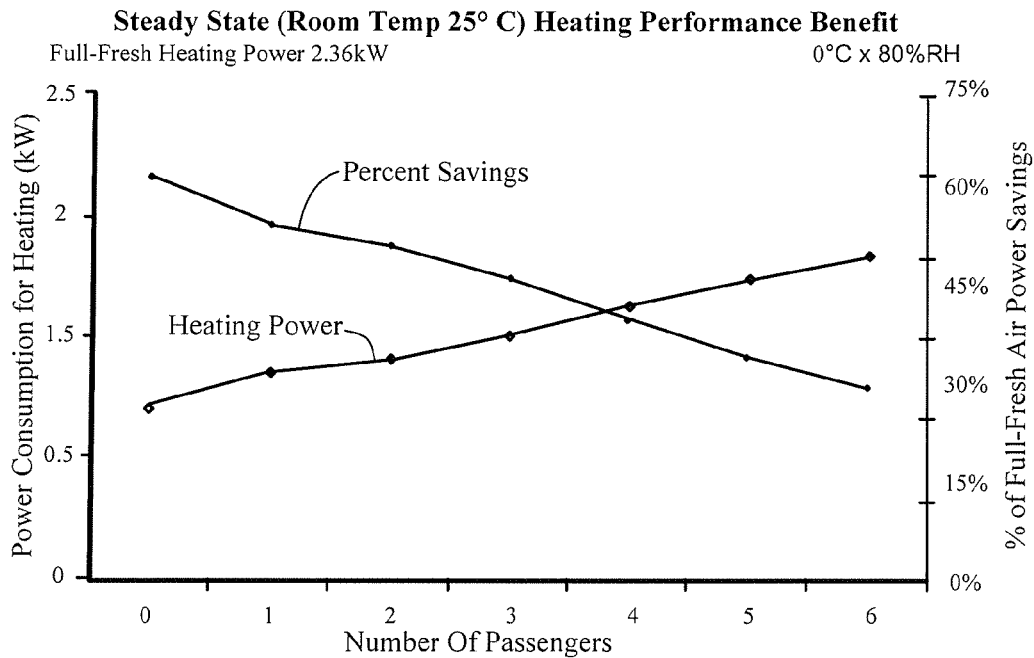
FIG. 17 is a chart showing data tabulated from calculations of energy savings in the tests represented by the data in FIG. 16 in accordance with the second embodiment.

FIG. 17 is a chart showing required heating power and associated energy savings from the tests represented by the data in FIG. 16. These results demonstrate how moisture can be managed effectively without use of the air conditioning system 22 (the air conditioning system 22 was off during all tests), which inherently translates into increased power savings opportunities.

Another benefit of the controlled blending mode is that the sensor 44 provides real-time feedback regarding the moisture density of the passenger compartment 14 as the air handling system 12 works over an extended period of time. Thus, the controller 48 "learns" to use more fresh air to compensate for abnormally high moisture conditions that could result from, for example, wet carpet, wet items being brought into the passenger compartment 14, or wet clothes worn by passengers. Consequently, the system can respond to overly moist conditions and flush the passenger compartment 14 with fresh air having a more manageable moisture density until an equilibrium condition is achieved (i.e., until operation within the prescribed target range is achieved).

When the air conditioning system 22 is activated, the colder temperature of the evaporator 34 can be used to dehumidify the air flowing through the housing 40, thus avoiding window condensation and fogging. While the air conditioning system 22 operates, the controller 48 moves the air intake valve mechanism 46 of the air handling system 12 to the closed position in response to the reduced moisture density in the passenger compartment 14. The reaction of the controller 48 to this condition has power savings benefits in that the air conditioning system 22 would be cooling a larger proportion of previously cooled recirculated air within the air flow. However, it is possible to achieve the desired comfort and window clearing results regardless of whether the fresh or recirculation modes are selected. Such results can even be achieved if the mode of operation of the air handling system 12 is spontaneously adjusted by other means, such as through operation of user controls within the vehicle 10 by an occupant.

When the air conditioning system 22 is not activated, the evaporator 34 typically remains warm. If the outside air conditions are such that the moisture density is greater than the desired target range, the controller 48 acts to open the air intake valve mechanism 46, thereby allowing fresh air into the air handling system 12. This can be an effective response to minimize cabin moisture accumulation (which will likely prevent window fogging) even if such a response creates a condition inconsistent with an ideal comfort level. However, in such instances passengers remain free to operate the air conditioning system 22 as desired.

Third Embodiment

Figure 18:
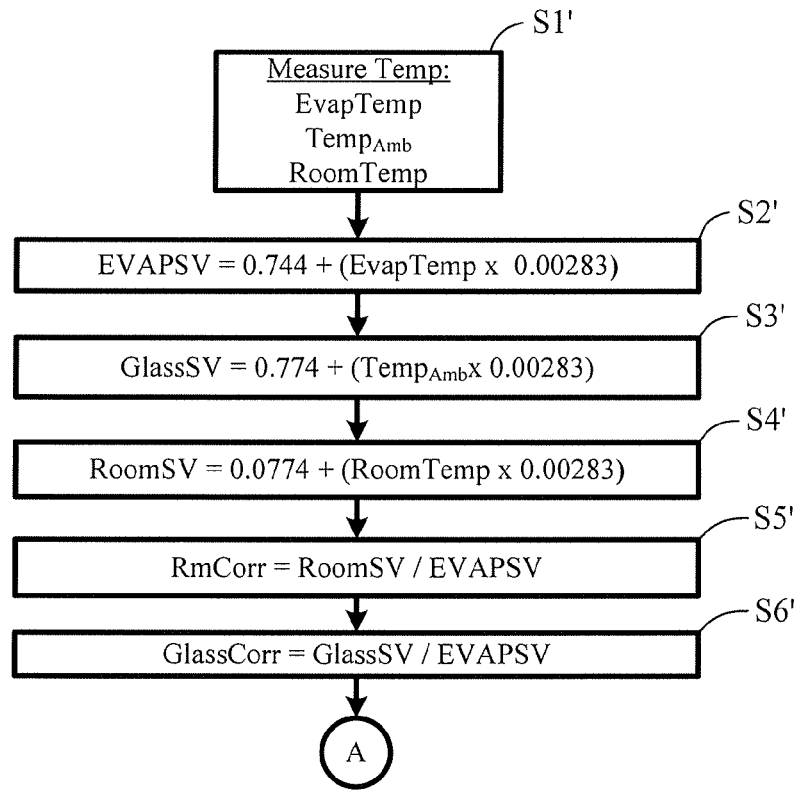
FIG. 18 is a chart showing a manner in which specific volume correction factors used in the controlled blending mode are determined in accordance with a third embodiment.
Figure 19:
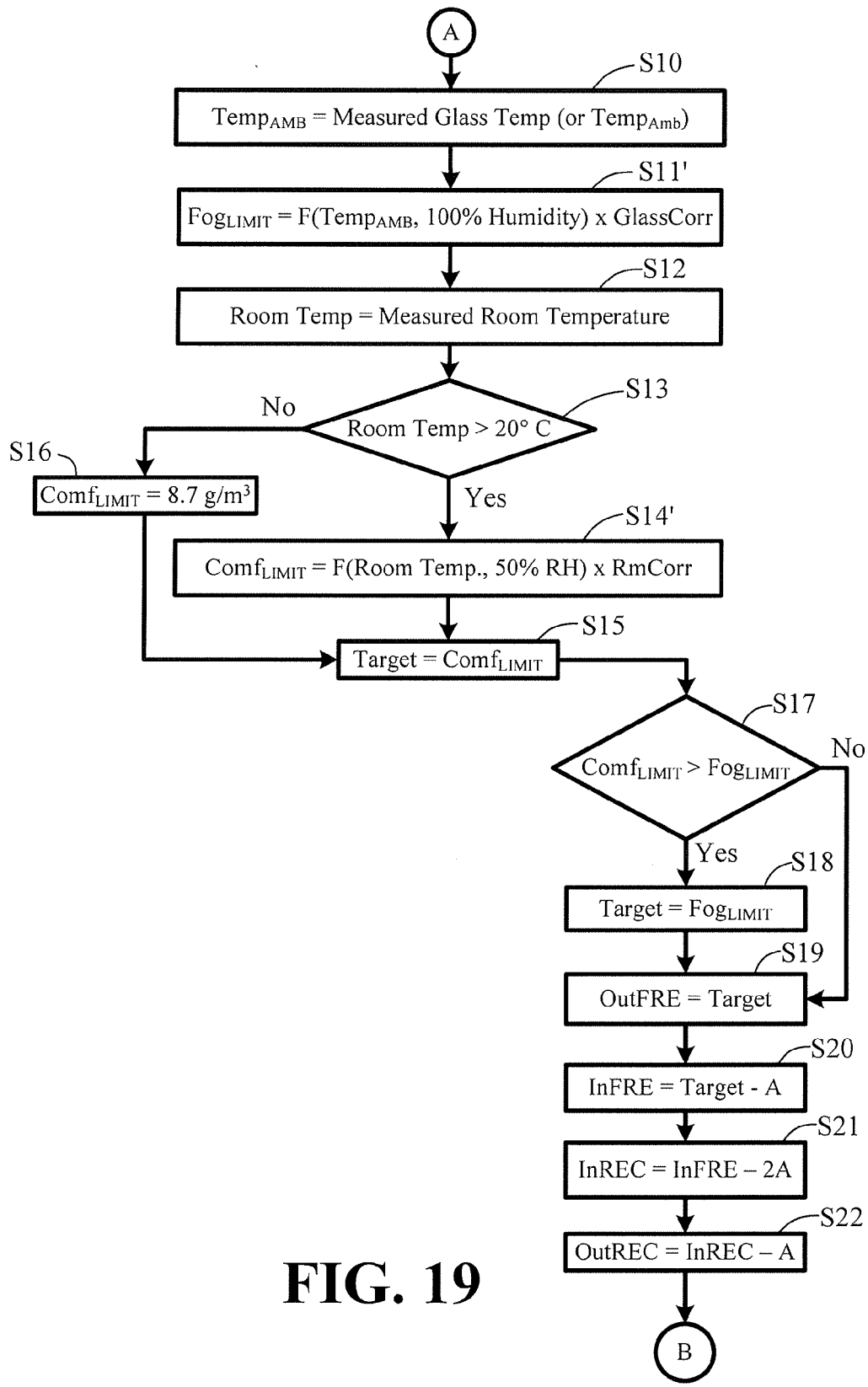
FIG. 19 is a flowchart similar to the flowchart in FIG. 9, showing operational steps conducted by the controller when operating the air handling system in the controlled blending mode in accordance with the third embodiment.

Referring now to FIG. 18-19, operation of the air handling system 12 in accordance with a third embodiment will now be explained. In the third embodiment, the structural aspects of the air handling system 12 remain basically unchanged compared to the second embodiment. However, in the third embodiment the controller 48 is programmed differently, as described in greater detail below.

In the third embodiment, the following situation is taken into consideration. As moist air is heated or cooled, the overall moisture density remains reasonably constant. However, as air is heated it expands and as it cools it contracts. Therefore, even though the moisture density or moisture mass remains generally constant, the small corresponding variation of the volume can impact the effectiveness of the controller 48 to maintain desirable conditions by adjusting the air intake valve mechanism 46. Since the condition of the evaporator is detected by the sensor 44, it is desirable to routinely update the room temperature moisture density and glass temperature moisture density constraints that are set forth in the logic presented in FIG. 9.

In the third embodiment, the logic executed by the controller 48 is identical to the logic presented in the flowcharts of FIGS. 9-12, except that several steps in the flowchart of FIG. 9 are modified slightly to include correction factors. Further, the correction factors are determined using logic presented in the flowchart shown in FIG. 18. FIG. 19 is nearly identical to FIG. 9, but it includes modified steps S11' and S14' which replace steps S11 and S14 of FIG. 9. The logic presented in the flowcharts of FIGS. 10-12 remains unchanged in the third embodiment. Therefore, for the third embodiment, description is mainly limited to the flowchart depicted in FIG. 18. Only steps S10', S11' and S14' presented in FIG. 19 are described below, since all other steps in FIG. 19 are identical to the steps presented in FIG. 9 of the second embodiment.

In FIG. 18, several correction variables are defined. Specifically, at step S1' several values are obtained. First, the evaporator temperature EvapTemp is detected by, for example, an air conditioning system 22 sensor (not shown) designed to detect the temperature of the evaporator 34. Second, the $Temp_{Amb}$ or temperature of the glass or window of the vehicle is obtained from a glass or window sensor (not shown). Third, the RoomTemp is detected by the sensor 44.

At step S2', a variable EVAPSV is defined as being equal to a correction factor (0.744) plus the product of the EvapTemp multiplied by a correction factor 0.00283. The two correction factors here are for conditions at sea level. For higher elevations, these correction factors can be modified as needed or desired.

At step S3', a variable GlassSV is defined as being equal to the correction factor (0.744) plus the product of the $Temp_{Amb}$ and the correction factor 0.00283. At step S4', a variable RoomSV is defined as being equal to the correction factor (0.744) plus the product of RoomTemp and the correction factor 0.00283.

At step S5', a variable RmCorr is defined as being equal to the variable RoomSV (from step S4') divided by the variable EVAPSV (from step S2').

At step S6', a variable GlassCorr is defined as being equal to the variable GlassSV (from step S3') divided by the variable EVAPSV (from step S2').

The variables RmCorr and GlassCorr are used in the steps S11' and S14' of the flowchart in FIG. 19.

In FIG. 19, at step S11', like step S11 in FIG. 9, a variable $Fog_{LIMIT}$ is defined. However in step S11', the variable $Fog_{LIMIT}$ is defined via the data in the Table 1 and further modified by multiplying the data obtained from Table 1 by the variable GlassCorr determined in step S6'. At S14' a variable $Comf_{LIMIT}$ is defined as being equal to the relevant moisture density value obtained from Table 1. However the value retrieved from Table 1 is further multiplied by the variable RmCorr (determined in step S5').

Only steps S11' and S14' are modified in FIG. 19. Otherwise, all logic and operational steps of FIG. 9 apply directly to the corresponding steps presented in FIG. 19. Therefore, further description of FIG. 19 is omitted for the sake of brevity. The operations presented in FIGS. 10-12 are fully employed in the third embodiment, unchanged from the description presented above in the second embodiment.

The controller 48 preferably includes a microcomputer with an air handling system control program that controls the air handling system 12, as discussed below. The controller 48 can also include other conventional components such as an input interface circuit, an output interface circuit, and storage devices such as a ROM (Read Only Memory)

device and a RAM (Random Access Memory) device. The microcomputer of the controller 48 is programmed to control the air handling system 12. The memory circuit stores processing results and control programs such as ones for air handling system operation that are run by the processor circuit. The controller 48 is operatively coupled to the air handling system 12 in a conventional manner. The internal RAM of the controller 48 stores statuses of operational flags and various control data. The internal ROM of the controller 48 stores the operation logic and data (for example, Table 1) for various operations. It will be apparent to those skilled in the art from this disclosure that the precise structure and algorithms for the controller 48 can be any combination of hardware and software that will carry out the functions of the present invention.

The various components of the vehicle 10, the passenger compartment 14 and the air conditioning system 22 are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle air handling system. Accordingly, these terms, as utilized to describe the present invention should be interpreted relative to a vehicle equipped with the vehicle air handling system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle air handling system comprising:
   a housing including a structure that defines an outlet configured to guide air flow to a passenger compartment, a duct connected to the outlet, a fresh air inlet configured to provide air from outside the vehicle into the housing and a recirculated air inlet configured to guide air flow from the passenger compartment into the housing;
   a blower arranged to move air through the housing from the fresh air inlet and the recirculated air inlet to the outlet;
   a sensor within the duct of the housing and positioned at the outlet of the housing measuring humidity and temperature values for the air flow exiting the outlet of the housing and flowing into the passenger compartment;
   an air intake valve mechanism configured to move between a closed position blocking air flow from the fresh air inlet into the housing and an open position unblocking air flow from the fresh air inlet into the housing; and
   a controller operably coupled to the air intake valve mechanism and configured to selectively position the air intake valve mechanism relative to the fresh air inlet to control an amount of fresh air introduced into the housing in order to maintain moisture density of the air flow exiting the housing and entering the passenger compartment within a prescribed range in response to the humidity and temperature measurements from the sensor.

2. The vehicle air handling system according to claim 1, further comprising
   an air conditioning evaporator positioned to receive the air flow from the outlet.

3. The vehicle air handling system according to claim 2, wherein
   the sensor is positioned at a downstream side of the air conditioning evaporator.

4. The vehicle air handling system according to claim 1, wherein
   the controller includes a lookup table with data that correlates humidity measurements and temperature measurements with moisture density data.

5. The vehicle air handling system according to claim 4, wherein
   the lookup table includes a sub-set of moisture density data that defines the prescribed range.

6. The vehicle air handling system according to claim 4, wherein the lookup table includes a sub-set of data corresponding to levels of moisture density at which condensation will form on passenger compartment surfaces of the vehicle.

7. The vehicle air handling system according to claim 6, wherein
the controller is further configured to adjust the position of the air intake valve mechanism to maintain moisture density of the air flow entering the passenger compartment below the levels of moisture density represented by the sub-set of data.

8. The vehicle air handling system according to claim 4, wherein
the controller is further configured to compare the humidity and temperature values obtained by the sensor with the data in the lookup table to determine the moisture density of the air entering the passenger compartment from the outlet.

9. The vehicle air handling system according to claim 1, wherein
the controller is further configured to position the air intake valve mechanism at any one of a plurality of predetermined positions between the closed position and the open position relative to the fresh air inlet.

10. The vehicle air handling system according to claim 1, wherein
the controller is further configured to control the position of the air intake valve mechanism to reduce formation of condensation on passenger compartment surfaces of windows of the vehicle.

11. The vehicle air handling system according to claim 1, further comprising
a detector that detects a number of passengers within the passenger compartment.

12. The vehicle air handling system according to claim 11, wherein
the controller is further configured to determine an estimated amount of moisture exhausted by the number of passengers within the passenger compartment, and
the controller is further configured to adjust the position of the air intake valve mechanism based the humidity and temperature measurements from the sensor and the estimated amount of moisture.

13. A method of controlling moisture density within vehicle passenger compartment comprising:
providing a housing with a structure that defines an outlet that guides air flow into a passenger compartment, a duct connected to the outlet, a fresh air inlet configured to provide fresh air to the air handling system and a recirculated air inlet that guides air flow from the passenger compartment into the housing;
measuring humidity and temperature of the air flow at the outlet of the housing passing from the outlet into the passenger compartment via a sensor located within the duct of the housing; and
controlling an amount of fresh air entering the housing through the fresh air inlet based on the humidity and temperature of the air flow at the outlet of the housing in order to maintain moisture density of the air flow exiting the outlet of the housing and entering the passenger compartment within a prescribed range.

14. The method according to claim 13, wherein
the controlling of the amount of fresh air entering the housing includes correlating the humidity and temperature of the air flow with moisture density data in a lookup table.

15. The method according to claim 14, wherein
the lookup table includes a sub-set of moisture density data that defines the prescribed range.

16. The method according to claim 14, wherein
the lookup table includes a sub-set of data corresponding to levels of moisture density at which condensation will form on passenger compartment surfaces of the vehicle.

17. The method according to claim 16, wherein
the controlling of the amount of fresh air entering the housing includes maintaining moisture density of the air flow entering the passenger compartment below the levels of moisture density represented by the sub-set of data.

18. The vehicle air handling system according to claim 14, wherein
the controlling of the amount of fresh air entering the housing includes comparing the humidity and temperature values obtained by the sensor with the information in the lookup table to determine the moisture density of the air entering the passenger compartment from the outlet.

19. The vehicle air handling system according to claim 13, wherein
the controlling of the amount of fresh air entering the housing is further based on an estimated amount of moisture exhausted by passengers within the passenger compartment.

20. The vehicle air handling system according to claim 13, wherein
the controlling of the amount of fresh air entering the housing is arranged to reduce condensation formation on passenger compartment surfaces of the vehicle.

* * * * *